United States Patent
Bohling

(10) Patent No.: US 11,078,020 B2
(45) Date of Patent: Aug. 3, 2021

(54) SYSTEM AND METHOD FOR RIPENING PRODUCE

(71) Applicant: Walmart Apollo, LLC, Bentonville, AR (US)

(72) Inventor: Joshua T. Bohling, Centerton, AR (US)

(73) Assignee: Walmart Apollo, LLC, Bentonville, AR (US)

(*) Notice: Subject to any disclaimer, the term of this patent is extended or adjusted under 35 U.S.C. 154(b) by 0 days.

(21) Appl. No.: 16/280,818

(22) Filed: Feb. 20, 2019

(65) Prior Publication Data

US 2020/0122926 A1 Apr. 23, 2020

Related U.S. Application Data

(60) Provisional application No. 62/746,614, filed on Oct. 17, 2018.

(51) Int. Cl.
*G06Q 10/08* (2012.01)
*B65G 1/137* (2006.01)

(52) U.S. Cl.
CPC ....... *B65G 1/1373* (2013.01); *G06Q 10/0832* (2013.01); *B65G 2201/0211* (2013.01)

(58) Field of Classification Search
CPC .. G01N 33/02; G01N 33/025; G06Q 10/0832; A23L 3/3418; A23L 3/3445; G07C 5/085; B25J 9/0081; G06F 17/5009; A23B 7/152
USPC .............. 705/332; 235/384; 700/257; 703/6; 426/231
See application file for complete search history.

(56) References Cited

U.S. PATENT DOCUMENTS

| | | | |
|---|---|---|---|
| 5,028,443 A | 7/1991 | Wade | |
| 5,531,158 A * | 7/1996 | Perryman, Jr. | ........ A23B 7/148 99/467 |
| 5,789,007 A | 8/1998 | Bianco | |
| 6,965,871 B1 | 11/2005 | Szabo | |
| 7,027,958 B2 | 4/2006 | Singh | |

(Continued)

FOREIGN PATENT DOCUMENTS

| | | |
|---|---|---|
| WO | 1995000030 | 1/1995 |
| WO | 2014144788 | 9/2014 |

(Continued)

OTHER PUBLICATIONS

Anne Trafton, "Comparing apples and oranges: New sensor can accurately measure fruits' ripeness, helping prevent loss of produce from spoilage", Apr. 30, 2012; MIT News Office, 5 pages (Year: 2012).*

(Continued)

*Primary Examiner* — Shannon S Campbell
*Assistant Examiner* — Freda A Nelson
(74) *Attorney, Agent, or Firm* — Fitch, Even, Tabin & Flannery LLP

(57) ABSTRACT

A ripening schedule for produce is created and the ripening schedule when implemented at a ripening chamber is effective to control the environmental conditions and the time spent in the ripening chamber by the produce in order to conform ripening conditions of the produce to the target shipping date. The ripening schedule is applied to control ripening conditions in the ripening chamber.

18 Claims, 4 Drawing Sheets

(56) References Cited

U.S. PATENT DOCUMENTS

| | | | |
|---|---|---|---|
| 7,185,810 | B2 | 3/2007 | White |
| 7,212,955 | B2 | 5/2007 | Kirshenbaum |
| 7,455,225 | B1* | 11/2008 | Hadfield ............... G07C 5/085 235/384 |
| 7,675,424 | B2 | 3/2010 | Debord |
| 7,693,739 | B2 | 4/2010 | Schmidtberg |
| 7,835,885 | B2 | 11/2010 | Ben-Tzur |
| 7,937,244 | B2 | 5/2011 | Kadaba |
| 7,960,176 | B2 | 6/2011 | Louvet |
| 8,112,303 | B2 | 2/2012 | Eglen |
| 8,203,603 | B2 | 6/2012 | Harbert |
| 8,447,665 | B1 | 5/2013 | Schoenharl |
| 8,803,970 | B2 | 8/2014 | Weisensale |
| 8,947,234 | B2 | 2/2015 | Doan |
| 9,030,295 | B2 | 5/2015 | Allen |
| 9,121,840 | B2 | 9/2015 | Minvielle |
| 9,218,585 | B2 | 12/2015 | Gupta |
| 9,316,595 | B2 | 4/2016 | Wakita |
| 9,514,323 | B2 | 12/2016 | Mehring |
| 9,710,754 | B2 | 7/2017 | Kaye |
| 9,789,518 | B2 | 10/2017 | Iino |
| 9,811,632 | B2 | 11/2017 | Grabiner |
| 9,824,298 | B1 | 11/2017 | Krishnan Gorumkonda |
| 9,835,498 | B2 | 12/2017 | Haarer |
| 9,915,638 | B2 | 3/2018 | Pakstaite |
| 10,060,798 | B1 | 8/2018 | Riscalla |
| 10,423,918 | B2 | 9/2019 | Mehring |
| 10,445,684 | B2 | 10/2019 | Mehring |
| 2009/0226584 | A1* | 9/2009 | Chiang ................ A47F 7/0078 426/395 |
| 2011/0029413 | A1 | 2/2011 | Ben-Tzur |
| 2012/0304014 | A1 | 11/2012 | Prophete |
| 2014/0180953 | A1* | 6/2014 | Westcott ............... A23B 7/148 705/332 |
| 2015/0290795 | A1* | 10/2015 | Oleynik ................ B25J 9/0081 700/257 |
| 2015/0347945 | A1 | 12/2015 | Reese |
| 2016/0292634 | A1 | 10/2016 | Mehring |
| 2017/0300856 | A1 | 10/2017 | Wilkinson |
| 2018/0246526 | A1 | 8/2018 | Wilkinson |
| 2018/0279023 | A1 | 9/2018 | Taylor |
| 2019/0104748 | A1* | 4/2019 | Kaun ..................... A23B 7/154 |
| 2019/0147396 | A1 | 5/2019 | Bohling |
| 2020/0005230 | A1* | 1/2020 | Brooks ............ G06Q 10/06315 |

FOREIGN PATENT DOCUMENTS

| | | | |
|---|---|---|---|
| WO | 2017035554 | | 3/2017 |
| WO | WO-2017035554 A1 * | 3/2017 | ............. A23B 7/152 |

OTHER PUBLICATIONS

Birgit Esser, Jan M. Schnorr, and Timothy M. Swager; "Selective Detection of Ethylene Gas Using Carbon Nanotube-based Devices: Utility in Determination of Fruit Ripeness", Apr. 19, 2012, doi.org/10.1002/anie.20120104201042, 5 pages (Year: 2012).*

3M; "3M MonitorMark Time Temperature Indicators"; https://www.3m.com/3M/en_US/company-us/all-3m-products/~/MONMARK-3M-MonitorMark-Time-Temperature-Indicators/?N=5002385+3293785721&rt=rud; Available at least as early as Feb. 7, 2019; pp. 1-4.

Agrofresh; "FreshCloud™ Storage Insights helps you monitor fruit in storage for added peace of mind"; https://www.agrofresh.com/technologies/freshcloud/storage-insights/; Available at least early as Feb. 7, 2019; pp. 1-4.

Ahearn, Brianna; "Kroger Wins for Food Temperature Innovation"; https://www.retailsupplychaininsights.com/doc/kroger-wins-for-food-temperature-innovation-0001; Jun. 4, 2015; pp. 1-2.

Ambrosus; "Decentralised IoT Netwroks for Next-Generation Supply Chains"; https://ambrosus.com/#home; Available at least as early as Feb. 7, 2019; pp. 1-12.

BT9 Intelligent Supply Chain Solutions; "Multi Segment, Real Time, Cold Chain Perishable Information"; http://www.bt9-tech.com; Published 2018; pp. 1-6.

Business Wire; "Emerson Expands Global Capabilities in Fresh Food Monitoring with Acquisitions of Locus Traxx and PakSense"; https://www.businesswire.com/news/home/20160830005136/en/Emerson-Expands-Global-Capabilities-Fresh-Food-Monitoring; Aug. 30, 2016; pp. 1-2.

Cao, Jordan; "Intelligent Container—powered by SAP HANA"; https://blogs.saphana.com/2018/09/27/intelligent-container-powered-sap-hana/; Sep. 27, 2018; pp. 1-5.

Carrefour Group; "Carrefour launches Europe's first food blockchain"; http://www.carrefour.com/current-news/carrefour-launches-europes-first-food-blockchain; Mar. 6, 2018; pp. 1-2.

De Troch, Stefan; "Item-level cold chain monitoring, another cool NFC solution"; https://blog.nxp.com/internet-of-things-2/item-level-cold-chain-monitoring-another-cool-nfc-solution; Aug. 30, 2016; pp. 1-5.

Digi; "Digi Honeycomb Keeping food safe just got easier and cheaper. Digi Honeycomb lets you monitor your entire Cold Chain System"; https://s3.amazonaws.com/telusdigital-marketplace-production/iot/user-content/product/64aa-o.pdf; Available at least as early as Feb. 7, 2019; pp. 1-2.

Dji Ferntech; "Drones for Agriculture"; https://www.djistore.co.nz/agriculture; Available at least as early as Feb. 7, 2019; pp. 1-13.

Ecoark Holdings, Inc.; "Ocean Mist Farms Selects Zest Fresh to Optimize Freshness Management"; https://www.globenewswire.com/news-release/2018/12/04/1661680/0/en/Ocean-Mist-Farms-Selects-Zest-Fresh-to-Optimize-Freshness-Management.html; Dec. 4, 2018; pp. 1-3.

Emerson; "ProAct Services and ProAct Transport"; https://www.emerson.com/en-us/commercial-residential/proact; Available at least as early as Feb. 7, 2019; pp. 1-4.

Emerson; "Real-Time Temperature & Location Trackers"; https://climate.emerson.com/en-us/products/controls-monitoring-systems/cargo-tracking-monitoring/trackers; Available at least as early as Feb. 7, 2019; pp. 1-4.

Emerson; "Supply Chain Data Loggers"; https://climate.emerson.com/en-us/products/controls-monitoring-systems/cargo-tracking-monitoring/loggers; Available at least as early as Feb. 7, 2019; pp. 1-4.

Fast Casual; "Wireless temperature-monitoring, tracking solution available for shipping perishable goods"; https://www.fastcasual.com/news/wireless-temperature-monitoring-and-tracking-solution-now-available-for-shipping-perishable-goods/; Aug. 15, 2017; pp. 1-10.

Food and Agriculture Organization of the United Nations; "Flying robots for food security"; http://www.fao.org/zhc/detail-events/en/c/428256; Aug. 10, 2016; pp. 1-3.

Freshai; "AI-powered waste reduction for smart food businesses."; http://freshai.farmsteadapp.com/; Available as early as Feb. 7, 2019; pp. 1-5.

freshfruitportal.com; "Zest Labs fights food waste by routing pallets according to real-time freshness"; https://www.freshfruitportal.com/news/2018/07/19/technology-zest-labs-food-waste-profits-sensors; Jul. 19, 2018; pp. 1-5.

Friedman, Phil; "AI, machine learning, and more efficient routing"; https://www.omnitracs.com/blog/ai-machine-learning-and-more-efficient-routing; Jun. 28, 2018; pp. 1-6.

Gabbett, Rita Jane; "Amazon using artificial intelligence to monitor food safety issues"; http://www.micausa.org/amazon-using-artificial-intelligence-monitor-food-safety-issues/; May 9, 2018; pp. 1-3.

Grand View Research; "Cold Chain Market Size Worth $447.50 Billion by 2025 | CAGR: 15.1%"; https://www.grandviewresearch.com/press-release/global-cold-chain-market; Mar. 2019; pp. 1-10.

Greenwalt, Megan; "Acquisition Leads to New, Fresh Food Waste Solution"; https://www.waste360.com/mergers-and-acquisitions/acquisition-leads-new-fresh-food-waste-solution; Aug. 15, 2018; pp. 1-6.

Hagen, Christian et al.; "A Fresh Look: Perishable Supply Chains Go Digital"; https://www.atkearney.com/operations-performance-transformation/article?/a/a-fresh-look-perishable-supply-chains-go-digital; Available at least as early as Feb. 7, 2019; pp. 1-22.

(56) References Cited

OTHER PUBLICATIONS

Harvard Business Review; "How Blockchain Will Accelerate Business Performance and Power the Smart Economy"; https://hbr.org/sponsored/2017/10/how-blockchain-will-accelerate-business-performance-and-power-the-smart-economy; Oct. 27, 2017; pp. 1-8.
Hsu, Jenny W.; "Freshippo Customers Can Track Farm-To-Shelf Journey for Food"; https://www.alizila.com/hema-food-tracking/; Aug. 7, 2018; pp. 1-6.
Husseini, Talal; "Walmart's 'Eden' artificial intelligence technology to inspect fresh food for spoilage"; https://www.foodprocessing-technology.com/news/walmarts-eden-artificial-intelligence-technology-inspect-fresh-food-spoilage; Mar. 2, 2018; pp. 1-4.
IBM; "Take your food data further with Fresh Insights for IBM Food Trust"; https://www.ibm.com/blockchain/solutions/food-trust/freshness; Available at least as early as Feb. 7, 2019; pp. 1-3.
Impact Vision; "Non-invasive, real time food quality information"; https://www.impactvi.com/; Available at least as early as Feb. 7, 2019; pp. 1-18.
Impinj; "Hy-Vee Grocery Automates Cold Chain Monitoring"; https://www.impinj.com/library/customer-stories/hy-vee-cold-chain-monitoring-increases-shelf-life/; Available as early as Feb. 7, 2019; pp. 1-3.
Infratab; "Products"; https://infratab.com/products/; Available at least as early as Feb. 7, 2019; pp. 1-2.
Intel; "Intelligent Dynamic Store Merchandising Solution Cuts Losses on Perishables and Raises Brand Awareness"; Available at least as early as Feb. 7, 2019; pp. 1-12.
Kroger; "Kroger Gets HarvestMark Allows consumers to trace the origin of salads"; https://www.cspdailynews.com/foodservice/kroger-gets-harvestmark; Oct. 29, 2009; pp. 1-11.
Marvin, Rob; "Blockchain: The Invisible Technology That's Changing the World"; https://in.pcmag.com/amazon-web-services/112363/blockchain-the-invisible-technology-thats-changing-the-world; Aug. 30, 2017; pp. 1-29.
Mazur, Michal; "Six Ways Drones Are Revolutionizing Agriculture"; https://www.technologyreview.com/s/601935/six-ways-drones-are-revolutionizing-agriculture; Jul. 20, 2016; pp. 1-5.
Musani, Parvez; "Eden: The Tech That's Bringing Fresher Groceries to You"; https://blog.walmart.com/innovation/20180301/eden-the-tech-thats-bringing-fresher-groceries-to-you; Mar. 1, 2018; pp. 1-4.
My Devices; "Alibaba Cloud and myDevices Partner to Launch Turnkey IoT Solutions in China"; https://mydevices.com/newspost/alibaba-cloud-mydevices-partner-launch-turnkey-iot-solutions-china/; Sep. 11, 2018; pp. 1-3.
Oracle; "Oracle Unveils Business-Ready Blockchain Applications"; https://www.oracle.com/nz/corporate/pressrelease/oow18-oracle-blockchain-applications-cloud-2018-10-23.html; Oct. 23, 2018; pp. 1-4.
Palanza, Rich; "IoT Monitoring: Rapidly Deliver on the Promise of IoT"; https://business.weather.com/blog/iot-monitoring-rapidly-deliver-on-the-promise-of-iot; May 16, 2018; pp. 1-4.
Peterson, Hayley; "Walmart is saving $2 billion with a machine called 'Eden' that inspects food and knows when it will spoil"; https://www.businessinsider.in/walmart-is-saving-2-billion-with-a-machine-called-eden-that-inspects-food-and-knows-when-it-will-spoil/articleshow/63127641.cms; Mar. 1, 2018; pp. 1-12.
Pridevel; "IoT Cold Chain Monitoring"; http://www.pridevel.com/sap-iot-cold-chain-monitoring; Available at least as early as Feb. 7, 2019; pp. 1-3.
Qa; "Carrefour and SGS Launch Visual Trust in China"; https://www.qualityassurancemag.com/article/carrefour-and-sgs-launch-visual-trust-in-china/; Sep. 28, 2017; pp. 1-4.
Ripple News Tech Staff; "Alibaba is Using Blockchain to Improve Consumer Confidence and Fight Food Fraud"; https://ripplenews.tech/2018/05/03/alibaba-is-using-blockchain-to-improve-consumer-confidence-and-fight-food-fraud/; May 3, 2018; pp. 1-7.
Sensefly; "Why Use Agriculture Drones?"; https://www.sensefly.com/industry/agricultural-drones-industry/; Available at least as early as Feb. 7, 2019; pp. 1-15.
Sensegrow; "Supply Chain Monitoring with Real-time IoT Platform"; http://www.sensegrow.com/blog/supply-chain-monitoring; May 10, 2018; pp. 1-5.
Smart Sense; "Supermarket Remote Monitoring Solutions"; https://www.smartsense.co/industries/retail/supermarkets; Available at least as early as Feb. 7, 2019; pp. 1-6.
Smilo; "The latest generation hybrid blockchain platform"; https://smilo.io/files/Smilo_White_Paper_V1.8.1.pdf; Available at least as early as Feb. 7, 2019; pp. 1-33.
Springer, Jon; "Walmart, Kroger join suppliers in blockchain food safety initiative"; https://www.supermarketnews.com/news/walmart-kroger-join-suppliers-blockchain-food-safety-initiative; Aug. 22, 2017; pp. 1-4.
TCS Worldwide; "TCS Cargo Monitoring Solution: Track freshness of perishable cargo"; https://www.tcs.com/cargo-monitoring-solution; Available at least as early as Feb. 7, 2019; pp. 1-7.
TE-FOOD; "TE-FOOD Partners with Halal Trail Bringing Halal Food Companies to the Blockchain"; https://www.reuters.com/brandfeatures/venture-capital/article?id=38153; May 31, 2018; pp. 1-6.
Tech Mahindra; "Cold Chain Monitoring"; https://www.techmahindra.com/services/NextGenSolutions/DES/Solutions/Cold_Chain_Monitoring.aspx; Available at least as early as Feb. 7, 2019; pp. 1-4.
Tech Mahindra; "Farm to fork"; https://www.techmahindra.com/services/NextGenSolutions/DES/Solutions/Farm_to_fork.aspx; Available at least as early as Feb. 7, 2019; pp. 1-2.
Tive; "A Complete Supply Chain Visibility System"; https://tive.co/product; Available at least as early as Feb. 7, 2019; pp. 1-7.
Tive; "Environmental Monitoring for Perishables"; https://tive.co/solution/environmental-monitoring-for-perishables/; Available at least as early as Feb. 7, 2019; pp. 1-5.
TraQtion; "TraQtion's Supply Chain Solution Manages Global Food Supplier Compliance and Audits"; https://www.traqtion.com/documents/TraQtion-Costco.pdf; Available as early as Feb. 7, 2019; pp. 1-2.
Trimble; "Trimble Acquires HarvestMark to Provide Food Traceability and Quality Control"; https://www.prnewswire.com/news-releases/trimble-acquires-harvestmark-to-provide-food-traceability-and-quality-control-300070050.html; Apr. 22, 2015; pp. 1-6.
Tsenso; "The Fresh Index: A Real-Time Shelf Life Indicator"; https://tsenso.com/en/freshindex-instead-of-bestbefore; Available at least as early as Feb. 7, 2019; pp. 1-5.
Verigo; "Introducing Pod Quality Continuous Product Life Data, From Farm to Store"; https://www.farmtoforkfresh.com/; Available at least as early as Feb. 7, 2019; pp. 1-8.
Wageningen UR Food & Biobased Research; "Food & Biobased Research"; https://www.worldfoodinnovations.com/userfiles/documents/FBR%20Corporate%20Brochure.pdf; Jul. 2014; pp. 1-24.
Whelan, Jenny; "Kelsius to Install FoodCheck Monitoring System in SuperValu and Centra Stores"; https://www.checkout.ie/kelsius-signs-deal-to-put-foodcheck-monitoring-system-in-supervalu-and-centra-stores/; Aug. 6, 2015; pp. 1-4.
Wynne-Jones, Stephen; "Maxima Group Unveils 'Electronic Nose' to Track Freshness"; https://www.esmmagazine.com/maxima-group-unveils-elecrtronic-nose-track-freshness/29589; Jul. 5, 2016; pp. 1-4.
Xinfin; "Enterprise Ready Hybrid Blockchain for Global Trade and Finance"; https://www.xinfin.org; Available at least as early as Feb. 7, 2019; pp. 1-13.
Yiannas, Frank; "How Walmart's SPARK Keeps Your Food Fresh"; https://blog.walmart.com/sustainability/20150112/how-walmarts-spark-keeps-your-food-fresh; Jan. 12, 2015; pp. 1-16.
Zest Labs; "Zest Fresh for Growers, Retailers and Restaurants"; https://www.zestlabs.com/zest-fresh-for-produce/; Available at least as early as Feb. 7, 2019; pp. 1-7.
International Search Report and Written Opinion of PCT/US2019/018882, dated Apr. 26, 2019, p. 1-11.
Lang, Walter, et al.; "The "Intelligent Container"—A Cognitive Sensor Network for Transport Management"; IEEE Sensors Journal; vol. 11, No. 3; Mar. 2011; pp. 688-598.
Pursche, Fabian; "Container 4.0: Smart transport on the high seas"; https://blog.bosch-si.com/industry40/container-4-0-smart-transport-high-seas/; Sep. 5, 2016; pp. 1-12.

(56) References Cited

OTHER PUBLICATIONS

Arah, Isaac Kojo et al.; "Preharvest and Postharvest Factors Affecting the Quality and Shelf Life of Harvested Tomatoes: A Mini Review"; http://downloads.hindawi.com/journals/ija/2015/478041.pdf; Available as early as Oct. 14, 2015; pp. 1-7.

Badia, Ricardo; "Cold Chain Logistics: Assessing the Challenge"; https://www.zestlabs.com/assessing-cold-chain-logistics/; Mar. 19, 2019; pp. 1-4.

Barthe, J.F.; "D.2.3.2. Database of consumer awareness, expectations and concerns on cold chain"; http://www.frisbee-project.eu/images/result/FRISBEE_DEL_2-3-2.pdf; Dec. 2, 2011; pp. 1-26.

Barthe, J.F.; "D.2.3.2.1 Survey questionnaires and materials for studies of consumer perspectives and attitudes towards refrigerated foods, the cold chain and relevant refrigeration technologies (Informed consent forms, privacy, personal data handling)"; http://www.frisbee-project.eu/images/result/FRISBEE_DEL_2-3-2-1.pdf ;Feb. 8, 2012; pp. 1-21.

Bogataj, M., et al.; "Stability of perishable goods in cold logistic chains"; International Journal of Production Economics, vol. 93-94; 2005; pp. 345-356.

Capgemini; "Schuitema Revolutionizes Food Quality Control Through RFID"; https://www.capgemini.com/se-en/wp-content/uploads/sites/29/2017/07/Schuitema_R evolutionizes_Food_Quality_Control_Through_RFID.pdf; Jul. 29, 2017; pp. 1-2.

Chainlink Research; "Achieving Consistent Product Quality"; https://www.zestlabs.com/wp-content/uploads/2016/12/Quality-Management-For-Produ ce.pdf; Available as early as Dec. 2016; pp. 1-8.

Chainlink Research; "Measuring Produce Freshness: The Key to Preventing Waste"; https://www.zestlabs.com/wp-content/uploads/2016/03/Measuring-Produce-Freshness. pdf; Available as early as Mar. 2016; pp. 1-12.

Chainlink Research; "Preemptive Freshness Management"; https://www.zestlabs.com/wp-content/uploads/2017/03/Preemptive-Freshness-Managem ent.pdf; Available as early as Mar. 2017; pp. 1-8.

Chainlink Research; "Blockchain's Role in the Produce Supply Chain"; https://www.zestlabs.com/wp-content/uploads/2018/01/Blockchains-Role-in-the-Prod uce-Supply-Chain.pdf; Available as early as Jan. 2018; pp. 1-20.

Chainlink Research; "Pallet-level Monitoring"; https://www.zestlabs.com/wp-content/uploads/2016/03/Pallet-Monitoring-for-the-Fr esh-Food-Supply-Chain.pdf; Available as early as Mar. 2016; pp. 1-9.

Chainlink Research; "Why Quality Consistency Matters"; https://www.zestlabs.com/wp-content/uploads/2016/03/Why-Food-Supply-Chain-Qualit y-Matters-1.pdf; Available as early as Mar. 2016; pp. 1-10.

Claussen, Ingrid C.; "Deliverable D.3.2.4.3 Literature review and experimental data of chilled, superchilled/supercooled fish quality and safety models"; http://www.frisbee-project.eu/images/result/ FRISBEE_DEL_3-2-4-3.pdf; May 6, 2011; pp. 1-29.

Colmer, Christian; "Chill—on! Transparent food quality all the way"; https://www.innovations-report.com/html/repork/medicine-health/chill-transparen t-food-quality-168201.html; Oct. 1, 2011; pp. 1-5.

Cotillon, C.; "Deliverable 8.2.1.1 Publication in Scientific Journals"; http://www.frisbee-project.eu/ images/result/FRISBEE_DEL_8.2.1.1.pdf; Oct. 27, 2011; pp. 1-5.

Cotillon, C.; "Deliverable 8.3.3.1 Mini conferences"; http://www.frisbee-project.eu/images/result/ FRISBEE_DEL_8.3.3.1.pdf; Dec. 7, 2011; pp. 1-8.

Cotillon, C.; "Deliverable 8.6.1 Report on collaboration with other EU projects"; http:// www.frisbee-project.eu/images/result/FRISBEE_DEL_8.6.1.pdf; Dec. 5, 2011; pp. 1-12.

Dada, Ali, et al.; "Sensor Applications in the Supply Chain: The Example of Quality-Based Issuing of Perishables"; The Internet of Things. Lecture Notes in Computer Science, edited by Christian Floerkemeier, et al.; vol. 4952; 2008; pp. 140-154.

Desmedt, Frederique; "Deliverable 8.1.1 Project logo, Leaflet and PowerPoint presentation"; http://www.frisbee-project.eu/images/result/FRISBEE_DEL_8.1.1.pdf; Nov. 19, 2010; pp. 1-30.

Desmedt, Frederique; "Deliverable 8.1.2 Project internet and intranet website"; http:// www.frisbee-project.eu/images/result/FRISBEE_DEL_8.1.2.pdf; Mar. 3, 2011; pp. 1-9.

Do Nascimento Nunes, M. C., et al.; "Improvement in fresh fruit and vegetable logistics quality: berry logistics field studies"; Philosophical Transactions of the Royal Society; http://dx.doi.org/10.1098/rsta.2013.0307; 2014; pp. 1-19.

Doyle, John P.; "Seafood Shelf Life as a Function of Temperature"; Alaska Sea Grant Marine Advisory Program; No. 30; 1989; pp. 1-6.

Evans, J.; "Deliverable D2.2.2 : Assessment of current refrigeration technologies of selected food industries and their potential improvement in current refrigeration"; http://www.frisbee-project.eu/images/result/FRISBEE_DEL_2-2-2.pdf; Jan. 30, 2012; pp. 1-181.

Evans, Judith et al.; "Deliverable D.2.2.3 : Analysis of potential of novel refrigeration technologies suitable for selected industries for application and improvement of food quality, energy consumption and environmental impact"; http://www.frisbee-project.eu/images/result/FRISBEE_DEL_2-2-3.pdf; Dec. 2, 2011; pp. 1-54.

Friedlos, Dave; "New Zealand Kiwifruit Processor Finds ROI"; https://www.rfidjournal.com/articles/view?4090; May 20, 2008; pp. 1-4.

Frisbee; "Frisbee european project—Archive"; https://web.archive.org/web/20180815100417/http://www.frisbee-project.eu/archive -results.html; Available as early as Aug. 15, 2018; pp. 1-5.

Frisbee; "Frisbee european project—Developing novel breakthrough technologies"; https://web.archive.org/web/20180316101206/http://www.frisbee-project.eu/researc h/92-developing-novel-breakthrough-technologies.html; Available as early Mar. 16, 2018; pp. 1-3.

Frisbee; "Frisbee european project—Frisbee at the Sixteenth Conference on Food Microbiology, Belgium"; http://www.frisbee-project.eu/news/40-frisbee-at-the-sixteenth-conference-on-foo d-microbiology.html; Nov. 15, 2011; pp. 1-1.

Frisbee; "Frisbee european project—Frisbee develops a Virtual Platform application"; http://www.frisbee-projecteu/news/90-frisbee-develops-a-virtual-platform-applic ation.html; Mar. 18, 2013; pp. 1-1.

Frisbee; "Frisbee european project—Frisbee dissemination activities"; http://www.frisbee-project.eu/news/91-frisbee-dissemination-activities.html; Mar. 18, 2013; pp. 1-1.

Frisbee; "Frisbee european project—Frisbee on the starting-blocks"; http://www.frisbee-project.eu/news/49-frisbee-on-the-starting-blocks.html; Mar. 9, 2012; pp. 1-2.

Frisbee; "Frisbee european project—Frisbee welcomes New Members Advisory Board"; http://www.frisbee-projecteu/news/48-new-members-advisory-board.html; Mar. 9, 2012; pp. 1-1.

Frisbee; "Frisbee european project—Frisbee: Latest Developments"; http://www.frisbee-project.eu/news/42-frisbee-project-latest-developments.html; Dec. 21, 2011; pp. 1-2.

Frisbee; "Frisbee european project—Join the first European Food Cold Chain Database!!!";http://www.frisbee-project.eu/news/55-database2.html; Jul. 9, 2012; pp. 1-2.

Frisbee; "Frisbee european project—Magnetic refrigeration technology. Frisbee's experts team work on this disruptive technology"; https://web.archive.org/web/20180316101206/http://www.frisbee-project.eu/researc h/51-magnetic-refrigeration-technology.html; Available as early as Mar. 16, 2018; pp. 1-3.

Frisbee; "Frisbee european project—MEP-scientist pairing scheme"; http://www.frisbee-project.eu/news/41-mep-scientist-pairing-scheme.html; Dec. 20, 2011; pp. 1-2.

Frisbee; "Frisbee european project—Nanoparticles, a concentrate of energy: PCM nanoparticles where low temperatures are needed"; https://web.archive.org/web/20180316101206/http://www.frisbee-project.eu/researc h/27-nanoparticles-a-concentrate-of-energy.html; Available as early as Mar. 16, 2018; pp. 1-2.

Frisbee; "Frisbee european project—Project Overview"; https://web.archive.org/web/20120211082956/http://www.frisbee-project.eu/project -overview.html; Available as early as Feb. 11, 2012; pp. 1-1.

Frisbee; "Frisbee european project—Saving energy by refrigeration predictive control"; https:// web.archive.org/web/20180316101206/http://www.frisbee-project.eu/researc h/52-saving-energy-by-refrigeration-predictive-control.html; Available as early as Mar. 16, 2018; pp. 1-3.

(56) References Cited

OTHER PUBLICATIONS

Frisbee; "Frisbee european project—Superchilling! a new technology to have your food products fresher than fresh"; https://web.archive.org/web/20180316101206/http://www.frisbee-project.eu/researc h/50-superchilling.html; Available as early as Mar. 16, 2018; pp. 1-3.

Frisbee; "Frisbee european project—Taking Europe's temperature: Cold chain database"; http://www.frisbee-projecteu/news/89-taking-europe%E2%80%99s-temperature-cold-c hain-database.html; Mar. 18, 2013; pp. 1-2.

Frisbee; "Frisbee european project—Workpackages"; https://web.archive.org/web/20120210124516/http://www.frisbee-project.eu/workpac kages.html; Available as early as Feb. 10, 2012; pp. 1-2.

Frisbee; "Simulate a cold chain"; https://frisbee-etool.irstea.fr; Available as early as 2020; pp. 1-3.

Gapud, Veny; "Food Safety Trends Exploring Implications of Mandatory Safety Standards in Retail and Foodservice"; https://www.foodsafetymagazine.com/magazine-archivel/december-2009january-2010/f ood-safety-trends-exploring-implications-of-mandatory-safety-standards-in-retail -and-foodservice/; Dec. 12, 2019; pp. 1-20.

Gaukler, Gary et al.; "Establishing Dynamic Expiration Dates for Perishables: An Application of RFID and Sensor Technology"; International Journal of Production Economics; vol. 193; Jul. 25, 2017; pp. 617-632.

GEIE/CEMA/ITP; "Deliverable D 8.3.1.3 Newsletter edited by GEIE for industrial use N°3"; http://www.frisbee-project.eu/images/result/FRISBEE_DEL_8.3.1.3.pdf; Mar. 13, 2012; pp. 1-10.

GEIE/CEMA/ITP; "Deliverable D8.3.1.2 Newsletter edited by GEIE for industrial use N°2"; http://www.frisbee-project.eu/images/result/FRISBEE_DEL_8.3.1.2.pdf; Oct. 27, 2011; pp. 1-10.

Giannakourou, M. C., et al.; "Application of a TTI-Based Distribution Management System for Quality Optimization of Frozen Vegetables at the Consumer End"; Journal of Food Science, vol. 68, Issue 1; Jan. 2003; pp. 201-209.

Hertog, M. L. A. T. M., et al.; "Shelf-life modelling for first-expired-first-out warehouse management"; Philosophical Transactions of the Royal Society; http://dx.doi.org/10.1098/rsta.2013.0306; 2014; pp. 1-15.

IBM; "DHL Breaks New Ground with RFID-Based Real-Time Tracking of Sensitive Shipments"; ftp://ftp.software.ibm.com/software/solutions/pdfs/ODC00298-USEN-00.pdf; Available as early as Mar. 2007; pp. 1-4.

Infratab; "Infratab Freshtime RF Sensor Blockchain Solutions for the Fresh Seafood Cold Chain"; https://web.aimglobal.org/external/wcpages/wcecommerce/eComItemDetailsPage.aspx?ItemID=656; 2019; pp. 1-5.

Jedermann, Reiner, et al.; "Communication techniques and challenges for wireless food quality monitoring"; Philosophical Transactions of the Royal Society; http://dx.doi.org/10.1098/ rsta.2013.0304; 2014; pp. 1-18.

Jedermann, Reiner, et al.; "Reducing food losses by intelligent food logistics"; Philosophical Transactions of the Royal Society; http://dx.doi.org/10.1098/rsta.2013.0302; 2014; pp. 1-20.

Kader, A. A.; "Pre- and Postharvest Factors Affecting Fresh Produce Quality, Nutritional Value, and Implications for Human Health"; Proceedings of the International Congress of Food Production and the Quality of Life, Sassari (Italy) Sep. 4-8, 2000, vol. 1, pp. 109-119.

Ketzenberg, M., et al.; "Expiration Dates and Order Quantities for Perishables"; European Journal of Operational Research; vol. 266, Issue 2; Apr. 2018; pp. 569-584.

Ketzenberg, M., et al.; "Managing Perishables with Time and Temperature History"; Production and Operations Management; vol. 24, Issue 1; Jan. 2015; pp. 54-70.

Ketzenberg, M., et al.; "The Value of RFID Technology Enabled Information to Manage Perishables"; https://pdfs.semanticscholar.org/bded/16af2e689b4fdcea7f8421f6e012a6041324.pdf; Apr. 2009; pp. 1-37.

Koutsoumanis, K., et al.; "Development of a safety monitoring and assurance system for chilled food product"; International Journal of Food Microbiology, vol. 100; 2005; pp. 253-260.

Leake, Linda L.; "The Search for Shelf Life Solutions"; https://www.ift.org/news-and-publications/food-technology-magazine/issues/2007/n ovember/columns/laboratory?p.=viewall; Nov. 1, 2007; pp. 1-8.

McBeath, Bill; "Winning the Freshness Wars: Creating Shopper Loyalty and Improving Profitability in Retail Grocery"; https://www.zestlabs.com/wp-content/uploads/2016/11/ZL_WP_FreshnessWars_060415.p df; Available as early as Feb. 2013; pp. 1-16.

Mehring, Peter; "Blockchain for Food Safety—Addressing the Challenges"; https://www.zestlabs.com/will-blockchain-solve-food-safety-challenges/; Sep. 26, 2018; pp. 1-4.

Mehring, Peter; "Zest Labs CEO Peter Mehring on the Walmart Lawsuit"; https://www.zestlabs.com/zest-labs-ceo-peter-mehring-walmart-lawsuit/; Aug. 1, 2018; pp. 1-4.

NBC Bay Area; "Tech Company Helps Inspect Food During Shutdown"; https://www.nbcbayarea.com/news/tech/tech-company-helps-inspect-food-during-shut down_bay-area/4851; Jan. 11, 2019; pp. 1-6.

NRDC; "Wasted: How America is Losing up to 40 Percent of Its Food From Farm to Fork Landfill"; https://www.nrdc.org/sites/default/files/wasted-2017-report.pdf; Available as early as Aug. 2017; pp. 1-58.

Opatova, H.; "Deliverable 8.2.2.1 Organisation of a Workshop in Prague 2011 at International Congress of Refrigeration"; http://www.frisbee-project.eu/images/result/FRISBEE_DEL_8.2.2.1.pdf; Oct. 27, 2011; pp. 1-8.

Payne, Kevin; " New Verizon Ad Sheds Light on Important Food Safety Issues"; https://www.zestlabs.com/new-verizon-ad-sheds-light-on-important-food-safety-iss ues/; Dec. 15, 2017; pp. 1-4.

Payne, Kevin; "Agriculture Technology and "The Messy Middle""; https://www.zestlabs.com/agriculture-technology-messy-middle/; Jun. 25, 2019; pp. 1-4.

Payne, Kevin; "Are You Ready to Make 2018 Your Best Year Ever?" https://www.zestlabs.com/are-you-ready-to-make-2018-your-best-year-ever; Feb. 13, 2018; pp. 1-4.

Payne, Kevin; "Blockchain for Fresh Food Supply Chains—Reality Sets in?"; https://www.zestlabs.com/blockchain-fresh-supply-chains-reality/; May 7, 2019; pp. 1-4.

Payne, Kevin; "Cold Chain Visibility: Who's Winning the Freshness Wars?"; https://www.zestlabs.com/cold-chain-visibility-freshness-wars/; Apr. 9, 2019; pp. 1-4.

Payne, Kevin; "Cold Supply Chain Variability—the Impact of Delays"; https://www.zestlabs.com/cold-supply-chain-variability/; Apr. 23, 2019; pp. 1-4.

Payne, Kevin; "Earth Day 2019 and Looking Ahead to 2020"; https://www.zestlabs.com/earth-day-2019/; Apr. 30, 2019; pp. 1-4.

Payne, Kevin; "Finding the Right Tools: Can Blockchain and IOT Fix the Fresh Food Supply Chain?—Register for the Webinar"; https://www.zestlabs.com/finding-the-right-tools-can-blockchain-and-iot-fix-the- fresh-food-supply-chain-register-for-the-webinari; Feb. 27, 2018; pp. 1-4.

Payne, Kevin; "Food Grower and Supplier Challenges: The Top 10"; https://www.zestlabs.com/food-growers-suppliers-challenges/; Feb. 19, 2019; pp. 1-4.

Payne, Kevin; "Food Labels and Food Waste—A Solution"; https://www.zestlabs.com/food-labels-food-waste/; Mar. 12, 2019; pp. 1-4.

Payne, Kevin; "Food Safety Tips: Three Things to Consider"; https://www.zestlabs.com/food-safety-tips-three-things-to-consider/; Jul. 2, 2019; pp. 1-4.

Payne, Kevin; "Fresh Produce and Health: What's the Connection?"; https://www.zestlabs.com/fresh-produce-health-interrelationship/; Apr. 2, 2019; pp. 1-4.

Payne, Kevin; "Grocery Shopper Trends 2019: Key Insights"; https://www.zestlabs.com/grocery-shopper-trends-2019-key-insights/; Jul. 23, 2019; pp. 1-4.

Payne, Kevin; "How to Feed a Hungry Planet: Food for Thought"; https://www.zestlabs.com/feed-a-hungry-planet/; Aug. 6, 2019; pp. 1-4.

(56) References Cited

OTHER PUBLICATIONS

Payne, Kevin; "Hyped Up? Blockchain and Why a Hybrid Model is Best"; https://www.zestlabs.com/hyped-up-blockchain-the-fresh-food-supply-chain-and-why-a-hybrid-model-is-best/; Jan. 30, 2018; pp. 1-4.

Payne, Kevin; "I'll Never Look at Strawberries the Same Way"; https://www.zestlabs.com/ill-never-look-at-strawberries-the-same-way/; Dec. 15, 2017; pp. 1-4.

Payne, Kevin; "Improving Operational Efficiency: TQM for the Fresh Food Supply Chain"; https://www.zestlabs.com/improving-operational-efficiency-deming-drucker/; Aug. 27, 2019; pp. 1-4.

Payne, Kevin; "Increasing Trucking Costs Further Squeezes Grocery Margins—Don't Waste Your Money!" https://www.zestlabs.com/increasing-trucking-costs-further-squeezes-grocery-marg ins-dont-waste-your-money/; Feb. 6, 2018; pp. 1-4.

Payne, Kevin; "IoT Sensors and Reducing Food Waste"; https://www.zestlabs.com/iot-sensors-reduce-food-waste/; Feb. 12, 2019; pp. 1-4.

Payne, Kevin; "Millennials Want True Transperency"; https://www.zestlabs.com/millennials-want-true-transparency/; Jan. 9, 2018; pp. 1-4.

Payne, Kevin; "Myth Busting: Produce Shrink is Caused at the Store"; https://www.zestlabs.com/myth-busting-produce-shrink-occurs-at-the-store/; Feb. 20, 2018; pp. 1-4.

Payne, Kevin; "New Zest Fresh for Produce Modules: Rapid Implementations and Faster ROI"; https://www.zestlabs.com/zest-fresh-produce-modules/; Jul. 10, 2019; pp. 1-4.

Payne, Kevin; "Online Grocery Shopping Options Abound But . . ."; https://www.zestlabs.com/online-grocery-shopping/; Feb. 5, 2019; pp. 1-4.

Payne, Kevin; "Preventing Food Waste: Multiple Approaches"; https://www.zestlabs.com/ preventing-food-waste-multiple-approaches/; Jul. 16, 2019; pp. 1-4.

Payne, Kevin; "Proactive Food Safety: Moving the Industry Forward"; https://www.zestlabs.com/proactive-food-safety/; Aug. 13, 2019; pp. 1-4.

Payne, Kevin; "Produce Marketing: Brandstorm Offers a Wealth of Insights"; https://www.zestlabs.com/produce-marketing-ideas; Feb. 26, 2019; pp. 1-4.

Payne, Kevin; "Reducing Fresh Food Waste: Addressing the Problem"; https://www.zestlabs.com/reducing-fresh-food-waste-problem/; Mar. 5, 2019; pp. 1-4.

Payne, Kevin; "Rethinking Food Safety and the Supply Chain"; https://www.zestlabs.com/rethinking-food-safety-supply-chain/; May 14, 2019; pp. 1-5.

Payne, Kevin; "Salad Kits: How to Ensure Freshness"; https://www.zestlabs.com/salad-kits-fresh/; Apr. 16, 2019; pp. 1-4.

Payne, Kevin; "Shelf-life Variability at Grocery Stores: Half-bad is Not Good"; https://www.zestlabs.com/shelf-life-variability-among-leading-grocery-stores/; Jun. 10, 2019; pp. 1-4.

Payne, Kevin; "Start the Year Fresh!" https://www.zestlabs.com/start-the-year-fresh/; Jan. 16, 2018; pp. 1-4.

Payne, Kevin; "Supply Chain Waste: Can We Fix the Problem? (Yes)"; https://www.zestlabs.com/supply-chain-waste/; Jul. 30, 2019; pp. 1-5.

Payne, Kevin; "Sustainability and the Supply Chain"; https://www.zestlabs.com/sustainability-supply-chain/; Jun. 18, 2019; pp. 1-4.

Payne, Kevin; "Sustainability or Greenwashing" https://www.zestlabs.com/sustainability-or-greenwashing/; Jan. 23, 2018; pp. 1-4.

Payne, Kevin; "The "Best If Used by" Date Label: Will It Reduce Food Waste?"; https://www.zestlabs.com/best-if-used-by-date-label/; Jun. 4, 2019; pp. 1-4.

Payne, Kevin; "The Emergence of Brand Marketing in Produce"; https://www.zestlabs.com/brand-marketing-produce/; Aug. 20, 2019; pp. 1-4.

Payne, Kevin; "The Grocery Shopping Experience: Fresh Foods, Fresh Ideas"; https://www.zestlabs.com/grocery-shopping-experience-fresh-foods/; May 21, 2019; pp. 1-4.

Payne, Kevin; "To Use or Not to Use—What's Up With Date Labels" https://www.zestlabs.com/date-label/; Jan. 2, 2018; pp. 1-4.

Payne, Kevin; "Want to Improve Your Grocery Margins? Take a Look at Your Supply Chain"; https://www.zestlabs.com/want-to-improve-your-grocery-margins-take-a-look-at-you r-supply-chain/; Dec. 19, 2017; pp. 1-4.

Payne, Kevin; "World Hunger Day 2019: Sustainability"; https://www.zestlabs.com/world-hunger-day-2019-sustainability/; May 28, 2019; pp. 1-4.

Payne, Kevin; "Your Technology Roadmap for Digital Transformation"; https://www.zestlabs.com/technology-roadmap/; Mar. 26, 2019; pp. 1-4.

Payne, Kevin; "A Picture Is Worth . . ."; https://www.zestlabs.com/a-picture-is-worth/; Apr. 3, 2018; pp. 1-4.

Payne, Kevin; "Before and After—the Benefits of Digital Transformation"; https://www.zestlabs.com/benefits-digital-transformation/; Jan. 29, 2019; pp. 1-5.

Payne, Kevin; "Being Proactive: What We Can Learn from Football"; https://www.zestlabs.com/being-proactive-learn-from-football/; Jul. 17, 2018; pp. 1-4.

Payne, Kevin; "Digital Transformation Technology: Is It Finally Time?"; https://www.zestlabs.com/digital-transformation-technology/; Aug. 7, 2018; pp. 1-4.

Payne, Kevin; "Experience the Many Benefits of Family Meals"; https://www.zestlabs.com/benefits-family-meals/; Sep. 3, 2019; pp. 1-4.

Payne, Kevin; "First Principles Thinking and the Fresh Food Supply Chain"; https://www.zestlabs.com/first-principles-thinking/; Oct. 2, 2018; pp. 1-4.

Payne, Kevin; "Five Days? the Causes of Shelf-life Variability"; https://www.zestlabs.com/five-days-shelf-life-variability/; Nov. 20, 2018; pp. 1-4.

Payne, Kevin; "Food Service Delivery: This Isn't What I Ordered!"; https://www.zestlabs.com/isnt-what-ordered/; Aug. 28, 2018; pp. 1-4.

Payne, Kevin; "Food Spoilage: the Impact on Your Business"; https://www.zestlabs.com/food-spoilage-impact-business/; Jan. 15, 2019; pp. 1-4.

Payne, Kevin; "Food Sustainability Goals: Noble But Are They Viable?"; https://www.zestlabs.com/food-sustainability-goals/; Aug. 14, 2018; pp. 1-4.

Payne, Kevin; "Fresh Food Industry Trends 2019—Our Predictions"; https://www.zestlabs.com/fresh-food-industry-trends-2019/; Jan. 2, 2019; pp. 1-4.

Payne, Kevin; "Fresh Food Industry Trends from 2018"; https://www.zestlabs.com/fresh-food-industry-trends-2018/; Dec. 11, 2018; pp. 1-4.

Payne, Kevin; "Fresh Food Sustainability—It's More Than Field to Fork"; https://www.zestlabs.com/fresh-food-sustainability/; Jan. 22, 2019; pp. 1-4.

Payne, Kevin; "Freshness Capacity: Strawberries Are Like Your Cell Phone . . ."; https://www.zestlabs.com/your-fresh-strawberries-are-like-your-cellphone/; Jul. 10, 2018; pp. 1-4.

Payne, Kevin; "Grocers Are Applying Artificial Intelligence"; https://www.zestlabs.com/grocers-turning-artificial-intelligence/; Oct. 9, 2018; pp. 1-4.

Payne, Kevin; "Growers and Suppliers—What Really Happens in the Food Supply Chain"; https://www.zestlabs.com/what-happens-fresh-food-supply-chain/; Apr. 24, 2018; pp. 1-5.

Payne, Kevin; "Improving Post-Harvest Operational Efficiency"; https://www.zestlabs.com/improving-operational-efficiency/; Sep. 18, 2018; pp. 1-4.

Payne, Kevin; "Is Your Fresh Food Supply Chain Stuck in the '60s?"; https://www.zestlabs.com/is-your-fresh-food-supply-chain-stuck-in-the-60s/; Mar. 13, 2018; pp. 1-4.

Payne, Kevin; "It's (Past) Time for Freshness Management"; https://www.zestlabs.com/managing-fresh-food-shelf-life/; Nov. 27, 2018; pp. 1-4.

Payne, Kevin; "It's Like Waze for the Fresh Food Supply Chain"; https://www.zestlabs.com/waze-fresh-food-supply-chain/; Apr. 10, 2018; pp. 1-5.

Payne, Kevin; "Let's Celebrate National Salad Month!"; https://www.zestlabs.com/lets-celebrate-national-salad-month/; May 1, 2018; pp. 1-4.

(56) References Cited

OTHER PUBLICATIONS

Payne, Kevin; "Let's Start At the Beginning"; https://www.zestlabs.com/lets-start-at-the-beginning/; May 15, 2018; pp. 1-4.
Payne, Kevin; "Margins Matter—Don't Get Squeezed"; https://www.zestlabs.com/6931-2/; Apr. 17, 2018; pp. 1-4.
Payne, Kevin; "Perishable Food Waste Cuts Profits & Raises Greenhouse Gases"; https://www.zestlabs.com/food-waste-profits-greenhouse-gases/; Sep. 11, 2018; pp. 1-4.
Payne, Kevin; "PMA Fresh Summit 2018—Wow!"; https://www.zestlabs.com/pma-fresh-summit/; Oct. 23, 2018; pp. 1-4.
Payne, Kevin; "PMA's Fresh Summit: Eat Up!"; https://www.zestlabs.com/pma-fresh-summit-2018/; Oct. 16, 2018; pp. 1-4.
Payne, Kevin; "Poor Quality Produce: Never Going Back Again"; https://www.zestlabs.com/never-going-back-again/; Jul. 3, 2018; pp. 1-4.
Payne, Kevin; "Premature Food Spoilage: Uh Oh, It's the Fuzz!"; https://www.zestlabs.com/uh-oh-its-the-fuzz/; Jun. 19, 2018; pp. 1-4.
Payne, Kevin; "Produce Shelf Life Extenders and Fresh Food Waste"; https://www.zestlabs.com/ shelf-life-extenders-food-waste/; Nov. 13, 2018; pp. 1-4.
Payne, Kevin; "Refed: Committed to Reducing U.S. Food Waste"; https://vvww.zestlabs.com/refed-committed-reducing-waste/; Oct. 30, 2018; pp. 1-4.
Payne, Kevin; "Romaine Lettuce Labeling—Zest Fresh Can Help"; https://www.zestlabs.com/romaine-lettuce-labeling!; Dec. 4, 2018; pp. 1-4.
Payne, Kevin; "Saving Money Day 1—Invest $1, Get $9 Back" ; https://www.zestlabs.com/saving-money-day-1/; Nov. 6, 2018; pp. 1-4.
Payne, Kevin; "Sep. Is National Family Meals Month"; https://www.zestlabs.com/september-family-meals-month/; Sep. 4, 2018; pp. 1-4.
Payne, Kevin; "Shelf-life Variability in Produce: The Five Causes"; https://www.zestlabs.com/shelf-life-variability-produce-five-causes/; Jan. 8, 2019; pp. 1-4.
Payne, Kevin; "Solving the Problem of Fresh Produce Waste"; https://www.zestlabs.com/solving-problem-fresh-food-waste/; Dec. 18, 2018; pp. 1-4.
Payne, Kevin; "Stay Cool! (and Visit Us at United Fresh!)"; https://www.zestlabs.com/stay-cool-and-visit-us-at-united-fresh/; Jun. 5, 2018; pp. 1-4.
Payne, Kevin; "Stop Doing That!"; https://www.zestlabs.com/stop-doing-that/; May 29, 2018; pp. 1-4.
Payne, Kevin; "Supply Chain Performance: The Fox and the Henhouse"; https://www.zestlabs.com/fox-hen-house!; Jun. 26, 2018; pp. 1-4.
Payne, Kevin; "The Fresh Food Industry and Charles Darwin"; https://www.zestlabs.com/charles-darwin-fresh-food-industry/; Aug. 21, 2018; pp. 1-4.
Payne, Kevin; "The Game of (Shelf) Life"; https://www.zestlabs.com/game-shelf-life/; Sep. 25, 2018; pp. 1-4.
Payne, Kevin; "Timing Is Everything—The Impact of Cut-To-Cool Time on Freshness"; https:// www.zestlabs.com/timing-is-everything-the-impact-of-cut-to-cool-time-on- freshness/; May 8, 2018; pp. 1-5.
Payne, Kevin; "What to do to Build Grocery Store Loyalty?"; https://www.zestlabs.com/grocery-store-loyalty/; Jul. 24, 2018; pp. 1-4.
Payne, Kevin; "What? No Bacon? (Cue Ominous Music)"; https://www.zestlabs.com/what-no-bacon-cue-ominous-music/; Mar. 6, 2018; pp. 1-5.
Payne, Kevin; "What's in the Bag?"; https://www.zestlabs.com/whats-in-the-bag/; May 22, 2018; pp. 1-4.
Payne, Kevin; "Where's the Beef (Been)?"; https://www.zestlabs.com/wheres-the-beef-been/; Mar. 27, 2018; pp. 1-5.
Payne, Kevin; "Zest Labs Offers Fresh Wishes for the New Year"; https://www.zestlabs.com/zest-labs-fresh-wishes-new-year/; Dec. 24, 2018; pp. 1-4.

ReFED; "A Roadmap to Reduce U.S. Food Waste by 20 Percent"; https://www.refed.com/downloads/ReFED_Report_2016.pdf; 2016; pp. 1-96.
ReFED; "Restaurant Food Waste Action Guide"; https://www.refed.com/downloads/ Restaurant_Guide_Web.pdf; 2018; pp. 1-44.
ReFED; "Retail Food Waste Action Guide"; https://www.refed.com/downloads/Retail_Guide_Web.pdf; 2018; pp. 1-44.
Ruiz-Garcia, Luis et al.; "Monitoring Cold Chain Logistics by Means of RFID"; http://cdn.intechweb.org/pdfs/8493.pdf; Feb. 1, 2010; pp. 1-16.
Ryan, John; "Why Blockchain Will Be Used to Improve Distribution Food Safety, Quality, and Traceability"; https://www.foodsafetymagazine.com/enewsletter/why-blockchain-will-be-used-to-im prove-distribution-food-safety-quality-and-traceability/; Feb. 5, 2019; pp. 1-3.
Scalco, Dan; "5 Ways to Ensure Meals Stay Fresh and Safe in Transit"; https://www.zestlabs.com/meals-stay-fresh-safe-transit/; Jun. 12, 2018; pp. 1-4.
Scotto Di Tella, F.; "Deliverable D8.3.1.1 Newsletter edited by GEIE for industrial use N°1"; http://www.frisbee-project.eu/images/result/FRISBEE_DEL_8.3.1.1.pdf; May 6, 2011; pp. 1-9.
Shacklett, Mary; "Customer Retention and Growth in Today's Competitive Retail Grocery Environment"; https://www.zestlabs.com/downloads/Food-Freshness-and-Customer-Satisfaction-Iran sworld-Research-Apr.-2019.pdf; Apr. 2019; pp. 1-7.
Shacklett, Mary; "Improving Profits and Operational Efficiency on the Farm"; https:// www.zestlabs.com/downloads/Improving-Operational-Efficiency-on-the-Farm-Transworld-Research-2018.pdf; Available as early as 2018; pp. 1-6.
Shacklett, Mary; "Optimizing Profit Margins in a Changing Retail Grocery Industry"; https://www.zestlabs.com/downloads/Optimizing-Profit-Margins-Transworld.pdf; 2018; pp. 1-10.
Siawsolit, Chokdee et al.; "The Value of Demand Information in Omni-Channel Grocery Retailing"; https://www.researchgate.net/publication/331048136_The_Value_of_Demand_Information_in_Omni-Channel_Grocery_Retailing; Available as early as Jan. 2019; pp. 1-11.
Stahl, Valerie et al.; "Deliverable D.3.2.4.2 Literature review and experimental data of chilled and frozen meat quality and safety models"; http://www.frisbee-project.eu/images/result/FRISBEE_DEL_3.2.4.2.pdf; Jun. 6, 2011; pp. 1-28.
Sunny George, Gwanpua; ''Deliverable D3.2.4.1 Literature review and experimental data of chilled apple quality models''; http://www.frisbee-project.eu/images/result/FRISBEE_DEL_3.2.4.1.pdf; Mar. 1, 2011; pp. 1-24.
Swedberg, Claire; "DOD Considers RFID-based Solutions for Tracking Food's Shelf Life"; https://www.rfidjournal.com/articles/pdf?11423; Feb. 11, 2014; pp. 1-3.
Swedberg, Claire; "Researchers Seek to Reduce Wastage for First-Strike Rations"; https://www.rfidjournal.com/articles/pdf?9162; Jan. 26, 2012; pp. 1-4.
Swedberg, Claire; "Schuitema Ponders Future of Fresh-Chain Pilot"; https://www.rfidjournal.com/articles/pdf?3793; Dec. 10, 2007; pp. 1-4.
Swedberg, Claire; "Starbucks Keeps Fresh with RFID"; https://www.rfidjournal.com/articles/view?2890; Dec. 13, 2006; pp. 1-1.
Taoukis, P. S., et al.; "Applicability of Time-Temperature Indicators as Shelf Life Monitors of Food Products"; Journal of Food Science; vol. 54, Issue 4; Jul. 1989; pp. 783-788.
Taoukis, P. S., et al.; "Use of time-temperature integrators and predictive modelling for shelf life control of chilled fish under dynamic storage conditions"; International Journal of Food Microbiology, vol. 53; 1999; pp. 21-31.
Taoukis, Petros et al.; "Deliverable D.2.1.2 Temperature monitoring techniques and traceability systems along the cold chain";http://www.frisbee-project.eu/images/result/FRISBEE_DEL_2%201%202.pdf; Jul. 26, 2011; pp. 1-28.
Taoukis, Petros; "Deliverable D 3.2.4.4 Literature review and experimental data of frozen milk products and vegetables quality models"; http://www.frisbee-project.eu/images/result/FRISBEE_DEL_3-2-4-4.pdf; Jun. 6, 2011; pp. 1-24.

(56) References Cited

OTHER PUBLICATIONS

This New World by Huffpost; "Eating Ugly: the Food Waste That Could Refeed America"; https://www.facebook.com/ThisNewWorldHuffPost/videos/428476821288487; Apr. 22, 2019; pp. 1-9.
Trust in Food™; "Sustainability Research Report 2019"; https://www.zestlabs.com/downloads/Trust-In-Food-Sustainability-Survey-2019.pdf; Available as early as Jul. 18, 2019; pp. 1-19.
Wells, John H., et al.; "A Kinetic Approach to Food Quality Prediction using Full-History Time-Temperature Indicators"; Journal of Food Science; vol. 53, Issue 6; Nov. 1988; pp. 1866-1871.
Wells, John H., et al.; "A Quality-Based Inventory Issue Policy for Perishable Foods"; Journal of Food Processing & Preservation; vol. 12, Issue 4; Jan. 1989; pp. 271-292.
Wells, John Henry, et al.; "Application of Time-Temperature Indicators in Monitoring Changes in Quality Attributes of Perishable and Semiperishable Foods"; Journal of Food Science; vol. 53, Issue 1; Jan. 1988; pp. 148-152, 156.
Weston, L.A. et. al.; "Preharvest Factors Affecting Postharvest Quality of Vegetables"; HortScience; vol. 32(5), Aug. 1997, pp. 812-816.
Williamson, Katie et al.; "Climate Change Needs Behavior Change"; https://www.zestlabs.com/ downloads/2018-CCNBC-Report.pdf; 2018; pp. 1-22.
Zelem, Mc.; "Deliverable D.2.3.1 National legal and ethical requirements for the surveys"; http://www.frisbee-project.eu/images/result/FRISBEE_DEL_2.3.1.pdf; Jun. 23, 2011; pp. 1-68.
*Zest Labs, Inc.* v *Walmart*; Bohling, Joshua; "Transcript of the Testimony of Bohling, Joshua"; Bushman Court Reporting; Case No. 4:18-CV-00500-JM; Aug. 15-16, 2019; pp. 5-6, 47-48, 52-69, 78, 80-82, 85, 87, 98-102, 107-134, 137-145, 158-163, 182-184, 209-210, 233-234, 239-242, 246, and 357.
*Zest Labs, Inc.* v *Walmart*; Dickinson, Q. Todd; "Expert Report of Q. Todd Dickinson"; United States District Court for the Eastern District of Arkansas; Case No. 4:18-CV-00500-JM; Oct. 29, 2019; pp. 1-33.
*Zest Labs, Inc.* v *Walmart*; Kunin, Stephen G.; "Rebuttal Expert Report of Stephen G. Kunin"; United States District Court for the Eastern District of Arkansas; Case No. 4:18-CV-00500-JM; Nov. 25 2019; pp. 1-38.
*Zest Labs, Inc.* v *Walmart*; Zest Labs, Inc. et al.; "Complaint"; United States District Court for the Eastern District of Arkansas; Case No. 4:18-CV-00500-JM; Aug. 1, 2018; pp. 1-26.
Zest Labs; "Blockchain for Supply Chains"; https://www.zestlabs.com/challenges/blockchain-for-supply-chains/; Available as early as Jul. 18, 2019; pp. 1-4.
Zest Labs; "Food Safety and the Supply Chain"; https://www.zestlabs.com/challenges/food-safety/; Available as early as Jul. 18, 2019; pp. 1-5.
Zest Labs; "Food Supplier Operational Efficiency"; https://www.zestlabs.com/challenges/food-supplier-operational-efficiency/; Available as early as Jul. 18, 2019; pp. 1-5.
Zest Labs; "Food Waste is a Significant Problem"; https://www.zestlabs.com/challenges/food-waste-challenge/; Available as early as Jul. 18, 2019; pp. 1-6.
Zest Labs; "Fresh Food Supply Chain"; https://www.zestlabs.com/challenges/fresh-food-supply-chain/; Available as early as Jul. 18, 2019; pp. 1-5.
Zest Labs; "Fresh Food Sustainability"; https://www.zestlabs.com/challenges/fresh-food-sustainability/; Available as early as Jul. 18, 2019; pp. 1-4.
Zest Labs; "Fresh Produce"; http://www.zestlabs.com/fresh-produce; Available as early as Oct. 21, 2017; pp. 1-14.
Zest Labs; "On-Demand Delivery"; https://www.zestlabs.com/on-demand-delivery/; Available as early as Oct. 22, 2017; pp. 1-7.
Zest Labs; "On-demand meal quality visibility from the restaurant to consumer delivery"; https://www.zestlabs.com/zest-delivery/; Available as early as Oct. 22, 2017; pp. 1-7.
Zest Labs; "Post-Harvest Technology"; https://www.zestlabs.com/challenges/post-harvest-technology/; Available as early as Jul. 18, 2019; pp. 1-8.
Zest Labs; "The Freshest Produce"; https://www.zestlabs.com/resources; Available as early as May 2, 2018; pp. 1-16.
Zest Labs; "Zest Fresh—Deep Dive"; https://www.zestlabs.com/resources; Available as early as May 2, 2018, pp. 1-15.
Zest Labs; "Zest Fresh Differentiation"; https://www.zestlabs.com/zest-fresh-differentiation/; Available as early as Jul. 18, 2019; pp. 1-6.
Zest Labs; "Zest Fresh for Beef, Poultry, Pork and Seafood"; https://www.zestlabs.com/zest-fresh-for-protein/; Available as early as Jul. 18, 2019; pp. 1-5.
Zest Labs; "Zest Fresh for Grocers"; https://www.zestlabs.com/zest-fresh-for-produce-for-grocers/; Available as early as Jul. 18, 2019; pp. 1-13.
Zest Labs; "Zest Fresh for Growers, Packers, and Shippers"; https://www.zestlabs.com/zest-fresh-for-growers-and-suppliers/; Available as early as Jul. 18, 2019; pp. 1-17.
Zest Labs; "Zest Fresh for Restaurants"; https://www.zestlabs.com/zest-fresh-for-produce-for-restaurants/; Available as early as Jul. 18, 2019; pp. 1-13.
Zest Labs; "Zest Fresh Grower Testimonial"; https://www.zestlabs.com/resources; Available as early as May 2, 2018; pp. 1-13.
Zest Labs; "Zest Fresh Overview"; https://www.zestlabs.com/resources; Available as early as May 2, 2018; pp. 1-19.
Zest Labs; "Zest Fresh Use Cases"; https://www.zestlabs.com/zest-fresh-use-cases/; Available as early as Jul. 18. 2019; pp. 1-6.
Zest Labs; "Zest Fresh: Pallet-level Quality Management from Harvest to Store"; http://www.zestlabs.com/zest-fresh; Available as early as Oct. 29, 2017; pp. 1-10.
Zest Labs; "Zest Labs Overview"; https://www.zestlabs.com/resources; Available as early as Aug. 1, 2018; pp. 1-13.
Zest Labs; " . . . Not Worth a Thousand Words—Why Traditional Temperature Loggers and Imaging Technologies are Inadequate to Determine Freshness and Reduce Waste"; https://www.zestlabs.com/wp-content/uploads/2018/03/WP-05-0318-Not-Worth-A-Thous and-Words.pdf; Mar. 5, 2018; pp. 1-6.
Zest Labs; "10 Limitations of Traditional Temperature Data Loggers and Why They're No Longer Adequate for the Cold Chain"; https://www.zestlabs.com/wp-content/uploads/2018/05/PB-04-0418-10-Limitations-of -Data-Loggers.pdf; May 4, 2018; pp. 1-3.
Zest Labs; "Before and After—The Benefits of Digital Transformation in the Fresh Food Supply Chain"; https://www.zestlabs.com/downloads/Before-and-After-Digital-Transformation.pdf; Jan. 13, 2019; pp. 1-6.
Zest Labs; "Blockchain and Achieving True Transparency—Proactively Managing Food Safety and Freshness with Blockchain and IoT Technologies"; https://www.zestlabs.com/wp-content/uploads/2018/01/WP-08-0118.Blockchain.and_.A chieving.True_.Transparency-1.pdf; Jan. 8, 2018; pp. 1-4.
Zest Labs; "Blockchain and Its Value to Suppliers"; https://www.zestlabs.com/downloads/Blockchain-and-Its-Value-to-Suppliers.pdf; Available as early as Jul. 18, 2019; pp. 1-5.
Zest Labs; "Comparing Pallet- and Trailer-level Temperature Monitoring—Implications on Quality, Freshness, Traceability and Profitability for Retail Grocers"; https://www.zestlabs.com/wp-content/uploads/2018/03/WP-04-0318-Pallet-vs-Trailer .pdf; Mar. 4, 2018; pp. 1-4.
Zest Labs; "Freshness Baseline Study—Sample Report"; http://www.zestlabs.com/wp-content/uploads/2018/03/Zest-Labs-Sample-Baseline-Rep ort.pdf; Available as early as Mar. 2018; pp. 1-11.
Zest Labs; "Freshness Myths—False Beliefs That Lead to Food Waste"; https://www.zestlabs.com/downloads/Freshness-Myths.pdf; Aug. 7, 2018; pp. 1-5.
Zest Labs; "Half-bad Is Not Good"; https://www.zestlabs.com/downloads/Grocery-Store-Variability.pdf; Jun. 15, 2019; pp. 1-11.
Zest Labs; "Improve Operational Efficiency—Optimize Labor and Process Adherence to Reduce Costs"; https://www.zestlabs.com/downloads/Improving-Operational-Efficiency.pdf; Available as early as Jul. 18, 2019; pp. 1-3.
Zest Labs; "Improving Quality and Profitability for Retail Grocers—The Benefits of Pallet-level Monitoring for the Fresh and Perishable Food Cold Chain"; https://www.zestlabs.com/wp-content/uploads/2017/12/WP-01-1117.Improving.Quality .and_.Profitability.for_.Retail.Grocers.pdf; Nov. 1, 2017; pp. 1-8.

(56) References Cited

OTHER PUBLICATIONS

Zest Labs; "Let's Start at the Beginning—Reducing Shrink Begins at Harvest"; https://www.zestlabs.com/wp-content/uploads/2018/05/WP-12-0518-Lets-Start-at-the -Beginning.pdf; May 12, 2018; pp. 1-4.
Zest Labs; "Margins Matter—Reducing Fresh Food Waste to Improve Product Margins by 6% or More"; https://www.zestlabs.com/wp-content/uploads/2018/04/WP-11-0418-Margins-Matter-1. pdf; Apr. 11, 2018; pp. 1-6.
Zest Labs; "Measuring and Managing Operational Efficiency for Growers and Suppliers"; https:// www.zestlabs.com/downloads/Zest-Fresh-Metrics-Datasheet.pdf; Aug. 25, 2019; pp. 1-5.
Zest Labs; "Monitoring the Safety and Quality of Fresh, Frozen and Processed Foods"; https://www.zestlabs.com/wpcontent/uploads/2016/03/IN-SB-Fresh Produce_RestaurantFoodService_031016. pdf; Mar. 10, 2016; pp. 1-2.
Zest Labs; "Pallet-level Quality Management from Harvest to Store"; https://www.zestlabs.com/wp-content/uploads/2016/03/IN_SB_FoodIndustry_ProduceGr owers_031016.pdf; Mar. 10, 2016; pp. 1-2.
Zest Labs; "Poor Customer Experiences—Half-Bad is Not Good! a Shelf-Life Variability Study"; https://www.zestlabs.com/downloads/Variability-Infographic.pdf; Available as early as Jul. 2019; pp. 1-1.
Zest Labs; "Proactive Freshness Management: Modernizing the Fresh Food Supply Chain to Reduce Waste and Improve Profitability"; https://www.zestlabs.com/downloads/Proactive-Freshness-Management.pdf; Feb. 6, 2019; pp. 1-7.
Zest Labs; "Reduce Shrink, Improve Profitability and Quality for Fresh Food"; https://www.zestlabs.com/wp-content/uploads/2016/03/In-Sb-Fresh Produce_RetailGro cers_031016.pdf; Mar. 10, 2016; pp. 1-3.
Zest Labs; "Shelf-life Variability Begins in the Field—Produce Pallets Harvested on the Same Day Vary by as Much as 86 Percent, Contributing to Shrink and Lost Profits"; https://www.zestlabs.com/wp-content/uploads/2018/02/Wp-10-0218-Shelf-life-Variab ility. pdf; Feb. 10, 2018; pp. 1-4.
Zest Labs; "Strawberries—Shelf-Life Variability"; https://www.zestlabs.com/downloads/Zest-Fresh-Strawberries-Report.pdf; Available as early as Jul. 2019; pp. 1-2.
Zest Labs; "The Best of Zest 2018—A Collection of Our Most Popular Blogs"; https://www.zestlabs.com/downloads/The-Best-of-Zest-2018.pdf; Available as early as 2018; pp. 1-15.
Zest Labs; "The ZIPR Code Freshness Metric—Dynamically providing the current freshness of each pallet to help you intelligently manage product and reduce shrink throughout the fresh food supply chain"; https://www.zestlabs.com/downloads/The-ZIPR-Code.pdf; Jun. 1, 2018; pp. 1-3.
Zest Labs; "Today, You Saved $67,571—How Zest Fresh for Managing the Produce Cold Chain Reduces Waste and Saves Retailers Money . . . Beginning on Day One"; https://www.zestlabs.com/downloads/Today-You-Saved.pdf; Jun. 3, 2018; pp. 1-6.
Zest Labs; "True Transparency for Freshness Management, Food Safety, Authenticity and Traceability"; https://www.zestlabs.com/wp-content/uploads/2018/03/SO-04-0218-Zest-Fresh-for-Protein-Solution-Overview.pdf; Feb. 4, 2018; pp. 1-2.
Zest Labs; "Zest Labs FAQ and Reference Guide"; https://www.zestlabs.com/downloads/Zest-Labs-FAQ-and-Reference-Guide.pdf; Jul. 1, 2018; pp. 1-6.
Zest Labs; "Zest Labs Professional Services"; https://www.zestlabs.com/wp-content/uploads/2018/03/SO-05-0318-Zest-Labs-Professional-Services.pdf; Mar. 5, 2018; pp. 1-2.
Zest Labs, Inc. v Walmart; ECF No. 002; Zest Labs, Inc. et al.; "Motion for Leave to File Complaint Under Seal and to Establish Briefing Schedule Relating to Potentially Confidential Information in Complaint"; United States District Court for the Eastern District of Arkansas; Case No. 4:18-CV-00500-JM; Aug. 1, 2018; pp. 1-4.
Zest Labs, Inc. v Walmart; ECF No. 003; Zest Labs, Inc. et al.; "Brief in Support of Motion for Leave to File Complaint Under Seal and to Establish Briefing Schedule Relating to Potentially Confidential Information Complaint"; United States District Court for the Eastern District of Arkansas; Case No. 4:18-CV-00500-JM; Aug. 1, 2018; pp. 1-4.
Zest Labs, Inc. v Walmart; ECF No. 035; Walmart; "Defendant'S Response to Plaintiffs' Motion for Leave to File Complaint Under Seal"; United States District Court for the Eastern District of Arkansas; Case No. 4:18-CV-00500-JM; Aug. 27, 2018; pp. 1-3.
Zest Labs, Inc. v Walmart; ECF No. 038; Zest Labs, Inc. et al.; "Plaintiffs' Reply in Support of Plaintiffs' Motion for Leave to File Complaint Under Seal"; United States District Court for the Eastern District of Arkansas; Case No. 4:18-CV-00500-JM; Aug. 31, 2018; pp. 1-3.
Zest Labs, Inc. v Walmart; ECF No. 041; Walmart; "Defendant'S Motion for Leave to File Under Seal"; United States District Court for the Eastern District of Arkansas; Case No. 4:18-CV-00500-JM; Sep. 4, 2018; pp. 1-3.
Zest Labs, Inc. v Walmart; ECF No. 098; Walmart; "Defendant'S Brief in Support of Its Motion for Protective Order and to Compel Identification of Alleged Trade Secrets"; United States District Court for the Eastern District of Arkansas; Case No. 4:18-CV-00500-JM; Feb. 11, 2019; pp. 1-29.
Zest Labs, Inc. v Walmart; ECF No. 101-01; Sammi, P. Anthony; "Exhibit A"; United States District Court for the Eastern District of Arkansas; Case No. 4:18-CV-00500-JM; Feb. 15, 2019; pp. 1-3.
Zest Labs, Inc. v Walmart; ECF No. 101-02; Tulin, Edward L.; "Exhibit B"; United States District Court for the Eastern District of Arkansas; Case No. 4:18-Cv-00500-JM; Feb. 15, 2019; pp. 1-4.
Zest Labs, Inc. v Walmart; ECF No. 101-03; Tulin, Edward L.; " Exhibit C"; United States District Court for the Eastern District of Arkansas; Case No. 4:18-CV-00500-JM; Feb. 15, 2019; pp. 1-5.
Zest Labs, Inc. v Walmart; ECF No. 101-04; Zest Labs, Inc. et al.; "Exhibit D Filed Under Seal Pursuant to Order Dated Sep. 7, 2018"; United States District Court for the Eastern District of Arkansas; Case No. 4:18-CV-00500-JM; Feb. 15, 2019; 1 page.
Zest Labs, Inc. v Walmart; ECF No. 101-05; Zest Labs, Inc. et al.; "Exhibit E Filed Under Seal Pursuant to Order Dated Sep. 7, 2018"; United States District Court for the Eastern District of Arkansas; Case No. 4:18-CV-00500-JM; Feb. 15, 2019; 1 page.
Zest Labs, Inc. v Walmart; ECF No. 101; Zest Labs, Inc. et al.; "Plaintiffs' Brief in Opposition to Defendant'S Motion for Protective Order and to Compel Identification of Trade Secrets"; United States District Court for the Eastern District of Arkansas; Case No. 4:18-CV-00500-JM; Feb. 15, 2019; pp. 1-28.
Zest Labs, Inc. v Walmart; ECF No. 102-01; Zest Labs, Inc. et al.; "Exhibit A"; United States District Court for the Eastern District of Arkansas; Case No. 4:18-CV-00500-JM; Feb. 20, 2019; pp. 1-28.
Zest Labs, Inc. v Walmart; ECF No. 102-02; Walmart; "Exhibit B"; United States District Court for the Eastern District of Arkansas; Case No. 4:18-CV-00500-JM; Feb. 20, 2019; pp. 1-59.
Zest Labs, Inc. v Walmart; ECF No. 102-03; Zest Labs, Inc. et al.; "Exhibit C Filed Under Seal"; United States District Court for the Eastern District of Arkansas; Case No. 4:18-CV-00500-JM; Feb. 20, 2019; 1 page.
Zest Labs, Inc. v Walmart; ECF No. 102-04; Walmart; "Exhibit D"; United States District Court for the Eastern District of Arkansas; Case No. 4:18-CV-00500-JM; Feb. 20, 2019; pp. 1-10.
Zest Labs, Inc. v Walmart; ECF No. 102-06; Zest Labs, Inc. et al.; "Exhibit F Filed Under Seal"; United States District Court for the Eastern District of Arkansas; Case No. 4:18-CV-00500-JM; Feb. 20, 2019; 1 page.
Zest Labs, Inc. v Walmart; ECF No. 102-07; Zest Labs, Inc. et al.; "Exhibit G Filed Under Seal"; United States District Court for the Eastern District of Arkansas; Case No. 4:18-CV-00500-JM; Feb. 20, 2019; 1 page.
Zest Labs, Inc. v Walmart; ECF No. 102-08; Williams, Fred I.; "Exhibit H"; United States District Court for the Eastern District of Arkansas; Case No. 4:18-CV-00500-JM; Feb. 20, 2019; pp. 1-5.
Zest Labs, Inc. v Walmart; ECF No. 102-09; Simons, Michael; "Exhibit I"; United States District Court for the Eastern District of Arkansas; Case No. 4:18-CV-00500-JM; Feb. 20, 2019; pp. 1-8.
Zest Labs, Inc. v Walmart; ECF No. 102-10; Williams, Fred I.; "Exhibit J"; United States District Court for the Eastern District of Arkansas; Case No. 4:18-CV-00500-JM; Feb. 20, 2019; pp. 1-4.

(56) References Cited

OTHER PUBLICATIONS

Zest Labs, Inc. v Walmart; ECF No. 102-11; Simons, Michael; "Exhibit K"; United States District Court for the Eastern District of Arkansas; Case No. 4:18-CV-00500-JM; Feb. 20, 2019; pp. 1-2.
Zest Labs, Inc. v Walmart; ECF No. 102-12; Tulin, Edward L.; "Exhibit L"; United States District Court for the Eastern District of Arkansas; Case No. 4:18-CV-00500-JM; Feb. 20, 2019; pp. 1-4.
Zest Labs, Inc. v Walmart; ECF No. 102-13; Sammi, P. Anthony; "Exhibit M"; United States District Court for the Eastern District of Arkansas; Case No. 4:18-CV-00500-JM; Feb. 20, 2019; pp. 1-3.
Zest Labs, Inc. v Walmart; ECF No. 102-14; Sammi, P. Anthony; "Exhibit N"; United States District Court for the Eastern District of Arkansas; Case No. 4:18-CV-00500-JM; Feb. 20, 2019; pp. 1-3.
Zest Labs, Inc. v Walmart; ECF No. 102; Zest Labs, Inc. et al.; "Plaintiffs' Motion to Compel Supplemental Responses to Interrogatories and Requests for Production From Defendant"; United States District Court for the Eastern District of Arkansas; Case No. 4:18-CV-00500-Jm; Feb. 20, 2019; pp. 1-6.
Zest Labs, Inc. v Walmart; ECF No. 103; Zest Labs, Inc. et al.; "Plaintiffs' Brief in Support of Motion to Compel Supplemental Responses to Interrogatories and Requests for Production From Defendant"; United States District Court for the Eastern District of Arkansas; Case No. 4:18-CV-00500-JM; Feb. 20, 2019; pp. 1-24.
Zest Labs, Inc. v Walmart; ECF No. 105-1; Walmart; "Exhibit A—Filed Under Seal Pursuant to Order Dated Sep. 7, 2018"; United States District Court for the Eastern District of Arkansas; Case No. 4:18-CV-00500-JM; Feb. 25, 2019; 1 page.
Zest Labs, Inc. v Walmart; ECF No. 105; Walmart; "Defendant's Response to Plaintiffs' Motion to Compel"; United States District Court for the Eastern District of Arkansas; Case No. 4:18-CV-00500-JM; Feb. 25, 2019; pp. 1-21.
Zest Labs, Inc. v Walmart; ECF No. 125; Zest Labs, Inc. et al.; "Plaintiffs' Motion to Compel Defendant Walmart to Comply With the Court's Mar. 6, 2019 Order and Otherwise Produce Technical Discovery"; United States District Court for the Eastern District of Arkansas; Case No. 4:18-CV-00500-JM; Apr. 22, 2019; pp. 1-9.
Zest Labs, Inc. v Walmart; ECF No. 126; Zest Labs, Inc. et al.; "Plaintiffs' Brief in Support of Motion to Compel Defendant Walmart to Comply With the Court's Mar. 6, 2019 Order and Otherwise Produce Technical Discovery"; United States District Court for the Eastern District of Arkansas; Case No. 4:18-CV-00500-JM; Apr. 22, 2019; pp. 1-21.
Zest Labs, Inc. v Walmart; ECF No. 130-1; Sammi, P. Anthony; "Zest V. Walmart: Mar. 29, 2019 M. Simons Letter to P. Sammi Re Deficient Production of Technical Documents"; United States District Court for the Eastern District of Arkansas; Case No. 4:18-CV-00500-JM; May 8, 2019; pp. 1-2.
Zest Labs, Inc. v Walmart; ECF No. 130-2; Tulin, Edward L.; "Zest V. Walmart: Deposition Notices"; United States District Court for the Eastern District of Arkansas; Case No. 4:18-CV-00500-JM; May 8, 2019; pp. 1-2.
Zest Labs, Inc. v Walmart; ECF No. 130-3; Simons, Michael; "Zest V. Walmart: Deposition Notices"; United States District Court for the Eastern District of Arkansas; Case No. 4:18-CV-00500-JM; May 8, 2019; pp. 1-3.
Zest Labs, Inc. v Walmart; ECF No. 130-4; Walmart; "Exhibit D—Filed Under Seal Pursuant to Order Dated Sep. 7, 2018"; United States District Court for the Eastern District of Arkansas; Case No. 4:18-CV-00500-JM; May 8, 2019; 1 page.
Zest Labs, Inc. v Walmart; ECF No. 130-5; Simons, Michael; "Zest Labs V. Walmart —Walmart's Apr. 5, 2019 Production"; United States District Court for the Eastern District of Arkansas; Case No. 4:18-CV-00500-JM; May 8, 2019; pp. 1-2.
Zest Labs, Inc. v Walmart; ECF No. 130; Walmart; "Defendant's Response to Plaintiffs' Motion to Compel Compliance With the Mar. 6, 2019 Order and Technical Discovery"; United States District Court for the Eastern District of Arkansas; Case No. 4:18-CV-00500-JM; May 8, 2019; pp. 1-26.
Zest Labs, Inc. v Walmart; ECF No. 131-1; Walmart; "Exhibit A—Filed Under Seal Pursuant to Order Dated Sep. 7, 2018"; United States District Court for the Eastern District of Arkansas; Case No. 4:18-CV-00500-JM; May 8, 2019; 1 page.
Zest Labs, Inc. v Walmart; ECF No. 131-2; Walmart; "Exhibit B—Filed Under Seal Pursuant to Order Dated Sep. 7, 2018"; United States District Court for the Eastern District of Arkansas; Case No. 4:18-CV-00500-JM; May 8, 2019; 1 page.
Zest Labs, Inc. v Walmart; ECF No. 131-3; Sammi, P. Anthony; "Re: 4:18-CV-00500-JM Zest Labs Inc et al V. Wal-Mart Inc"; United States District Court for the Eastern District of Arkansas; Case No. 4:18-CV-00500-JM; May 8, 2019; 1 page.
Zest Labs, Inc. v Walmart; ECF No. 131-4; Simons, Michael; "Re: 4:18-CV-00500-JM Zest Labs Inc et al V. Wal-Mart Inc"; United States District Court for the Eastern District of Arkansas; Case No. 4:18-CV-00500-JM; May 8, 2019; 1 page.
Zest Labs, Inc. v Walmart; ECF No. 131; Walmart; "Defendant's Sur-Reply Brief in Further Opposition to Plaintiffs' Motion to Compel"; United States District Court for the Eastern District of Arkansas; Case No. 4:18-CV-00500-JM; May 8, 2019; pp. 1-21.
Zest Labs, Inc. v Walmart; ECF No. 250; Walmart; "Defendant's Reply Brief in Support of Its Motion to Exclude Proposed Expert Testimony of Patent Attorney Q. Todd Dickinson"; United States District Court for the Eastern District of Arkansas; Case No. 4:18-CV-00500-JM; Mar. 27, 2020; pp. 1-13.
Zest Labs, Inc. v Walmart; ECF No. 257-1; Walmart; "Defendant's Surreply in Further Opposition to Zest Labs, Inc.'S Motion for Partial Summary Judgment That Walmart Used and Disclosed Zest's Information in the Walmart Application"; United States District Court for the Eastern District of Arkansas; Case No. 4:18-CV-00500-JM; Mar. 31, 2020; pp. 1-168.
Zest Labs, Inc. v Walmart; ECF No. 257-1; Walmart; "Defendant's Surreply in Further Opposition to Zest Labs, Inc.'s Motion for Partial Summary Judgment That Walmart Used and Disclosed Zest's Information in the Walmart Application"; United States District Court for the Eastern District of Arkansas; Case No. 4:18-CV-00500-JM; Mar. 31, 2020; pp. 169-336.
Zest Labs, Inc. v Walmart; ECF No. 257-1; Walmart; "Defendant's Surreply in Further Opposition to Zest Labs, Inc.'s Motion for Partial Summary Judgment That Walmart Used and Disclosed Zest's Information in the Walmart Application"; United States District Court for the Eastern District of Arkansas; Case No. 4:18-CV-00500-JM; Mar. 31, 2020; pp. 337-342.
Zest Labs, Inc. v Walmart; ECF No. 257; Walmart; "Defendant's Motion for Leave to File Surreply in Further Opposition to Zest Labs, Inc.'s Motion for Partial Summary Judgment That Walmart Used and Disclosed Zest's Information in the Walmart Application"; United States District Court for the Eastern District of Arkansas; Case No. 4:18-CV-00500-JM; Mar. 31, 2020; pp. 1-3.
Zest Labs, Inc. v Walmart; ECF No. 261-1; Blitzer, Rachel R.; "Declaration of Rachel R. Blitzer Regarding Walmart's Surreply in Further Opposition to Zest Labs, Inc.'s Motion for Partial Summary Judgment That Walmart Used and Disclosed Zest's Information in the Walmart Application"; United States District Court for the Eastern District of Arkansas; Case No. 4:18-CV-00500-JM; Apr. 6, 2020; pp. 1-169.
Zest Labs, Inc. v Walmart; ECF No. 261-1; Blitzer, Rachel R.; "Declaration of Rachel R. Blitzer Regarding Walmart's Surreply in Further Opposition to Zest Labs, Inc.'s Motion for Partial Summary Judgment That Walmart Used and Disclosed Zest's Information in the Walmart Application"; United States District Court for the Eastern District of Arkansas; Case No. 4:18-CV-00500-JM; Apr. 6, 2020; pp. 170-337.
Zest Labs, Inc. v Walmart; ECF No. 261; Walmart; "Defendant's Surreply in Further Opposition to Zest Labs, Inc.'s Motion for Partial Summary Judgment That Walmart Used and Disclosed Zest's Information in the Walmart Application"; United States District Court for the Eastern District of Arkansas; Case No. 4:18-CV-00500-JM; Apr. 6, 2020; pp. 1-5.
Zest Labs, Inc. v Walmart; ECF No. 262; Walmart; "Brief in Support of Defendant's Motion for Summary Judgment"; United States District Court for the Eastern District of Arkansas; Case No. 4:18-CV-00500-JM; Apr. 21, 2020; pp. 1-54.
Zest Labs, Inc. v Walmart; ECF No. 263; Walmart; "Defendant's Motion to Exclude Certain Proposed Expert Testimony of Mark

(56) References Cited

OTHER PUBLICATIONS

Lanning"; United States District Court for the Eastern District of Arkansas; Case No. 4:18-CV-00500-JM; Apr. 21, 2020; pp. 1-6.
*Zest Labs, Inc.* v *Walmart*; ECF No. 264; Walmart; "Brief in Support of Defendant's Motion to Exclude Proposed Expert Testimony of Mark Lanning"; United States District Court for the Eastern District of Arkansas; Case No. 4:18-CV-00500-JM; Apr. 21, 2020; pp. 1-26.
*Zest Labs, Inc.* v *Walmart*; ECF No. 265; Walmart; "Defendant's Motion to Exclude Testimony of Damages Expert Stephen L. Becker, Ph.D."; United States District Court for the Eastern District of Arkansas; Case No. 4:18-CV-00500-JM; Apr. 21, 2020; pp. 1-7.
*Zest Labs, Inc.* v *Walmart*; ECF No. 266; Walmart; "Brief in Support of Defendant's Motion to Exclude Testimony of Damages Expert Stephen L. Becker, Ph.D."; United States District Court for the Eastern District of Arkansas; Case No. 4:18-CV-00500-JM; Apr. 21, 2020; pp. 1-22.
*Zest Labs, Inc.* v *Walmart*; ECF No. 267; Walmart; "Defendant's Response to Zest Labs, Inc.'s Motion for Summary Judgment That Information in Walmart's Patent Application Was Not Generally Known or Readily Ascertainable"; United States District Court for the Eastern District of Arkansas; Case No. 4:18-CV-00500-JM; Apr. 21, 2020; pp. 1-23.
*Zest Labs, Inc.* v *Walmart*; ECF No. 268; Walmart; "Defendant's Response to Zest Labs, Inc.'s Motion for Partial Summary Judgment That Walmart Used and Disclosed Zest Labs' Information in the Walmart Applications"; United States District Court for the Eastern District of Arkansas; Case No. 4:18-CV-00500-JM; Apr. 21, 2020; pp. 1-29.
*Zest Labs, Inc.* v *Walmart*; ECF No. 269; Walmart; "Defendant's Response to Plaintiffs' Motion to Exclude Testimony of Walmart's Damages Expert, Dr. William Choi"; United States District Court for the Eastern District of Arkansas; Case No. 4:18-CV-00500-JM; Apr. 21, 2020; pp. 1-17.
*Zest Labs, Inc.* v *Walmart*; ECF No. 270; Walmart; "Defendant's Response to Plaintiffs' Motion to Exclude Testimony of Walmart's Technical Expert, Dr. David Dobkin, Ph.D."; United States District Court for the Eastern District of Arkansas; Case No. 4:18-CV-00500-JM; Apr. 21, 2020; pp. 1-13.
*Zest Labs, Inc.* v *Walmart*; ECF No. 271; Walmart; "Defendant's Response to Plaintiffs' Motion to Exclude Testimony of Walmart's Technical Expert, Dr. Catherine Adams Hutt, Ph.D."; United States District Court for the Eastern District of Arkansas; Case No. 4:18-CV-00500-JM; Apr. 21, 2020; pp. 1-25.
*Zest Labs, Inc.* v *Walmart*; ECF No. 272; Walmart; "Defendant's Reply Brief in Support of Its Motion to Exclude Testimony of Damages Expert Stephen L. Becker, Ph.D."; United States District Court for the Eastern District of Arkansas; Case No. 4:18-CV-00500-JM; Apr. 21, 2020; pp. 1-22.
*Zest Labs, Inc.* v *Walmart*; ECF No. 273; Walmart; "Defendant's Reply Brief in Support of Its Motion for Summary Judgment"; United States District Court for the Eastern District of Arkansas; Case No. 4:18-CV-00500-JM; Apr. 21, 2020; pp. 1-56.
*Zest Labs, Inc.* v *Walmart*; ECF No. 274; Walmart; "Defendant's Reply Brief in Support of Its Motion to Exclude Proposed Expert Testimony of Mark Lanning"; United States District Court for the Eastern District of Arkansas; Case No. 4:18-CV-00500-JM; Apr. 21, 2020; pp. 1-22.
*Zest Labs, Inc.* v *Walmart*; ECF No. 275; Zest Labs, Inc. et al.; "Zest Labs Inc.'s Motion for Partial Summary Judgment That Walmart Used and Disclosed Zest's Information in the Walmart Applications"; United States District Court for the Eastern District of Arkansas; Case No. 4:18-CV-00500-JM; Apr. 21, 2020; pp. 1-4.
*Zest Labs, Inc.* v *Walmart*; ECF No. 276; Zest Labs, Inc. et al.; "Plaintiffs' Motion to Exclude Testimony of Walmart's Expert, Dr. David P. Dobkin"; United States District Court for the Eastern District of Arkansas; Case No. 4:18-CV-00500-JM; Apr. 21, 2020; pp. 1-3.
*Zest Labs, Inc.* v *Walmart*; ECF No. 277; Zest Labs, Inc. et al.; "Brief in Support of Plaintiffs' Motion to Exclude the Testimony of Walmart's Expert Witness, Dr. David P. Dobkin"; United States District Court for the Eastern District of Arkansas; Case No. 4:18-CV-00500-JM; Apr. 21, 2020; pp. 1-59.
*Zest Labs, Inc.* v *Walmart*; ECF No. 278; Zest Labs, Inc. et al.; "Plaintiffs' Motion to Exclude Testimony of Walmart Expert, Dr. Catherine Adams Hutt"; United States District Court for the Eastern District of Arkansas; Case No. 4:18-CV-00500-JM; Apr. 21, 2020; pp. 1-4.
*Zest Labs, Inc.* v *Walmart*; ECF No. 279; Zest Labs, Inc. et al.; "Brief in Support of Plaintiffs' Motion to Exclude the Testimony of Walmart's Expert Witness, Dr. Catherine Adams Hutt"; United States District Court for the Eastern District of Arkansas; Case No. 4:18-CV-00500-JM; Apr. 21, 2020; pp. 1-64.
*Zest Labs, Inc.* v *Walmart*; ECF No. 280; Zest Labs, Inc. et al.; "Zest Labs Inc.'s Motion for Partial Summary Judgment That Information in Walmart's Patent Application Was Not Generally Known or Readily Ascertainable"; United States District Court for the Eastern District of Arkansas; Case No. 4:18-CV-00500-JM; Apr. 21, 2020; pp. 1-4.
*Zest Labs, Inc.* v *Walmart*; ECF No. 281; Zest Labs, Inc. et al.; "Plaintiffs' Motion to Exclude Testimony of Walmart's Damages Expert, Dr. William Choi"; United States District Court for the Eastern District of Arkansas; Case No. 4:18-CV-00500-JM; Apr. 21, 2020; pp. 1-4.
*Zest Labs, Inc.* v *Walmart*; ECF No. 282; Zest Labs, Inc. et al.; "Plaintiffs' Brief in Support of Motion to Exclude Testimony of Walmart's Damages Expert, Dr. William Choi"; United States District Court for the Eastern District of Arkansas; Case No. 4:18-CV-00500-JM; Apr. 21, 2020; pp. 1-30.
*Zest Labs, Inc.* v *Walmart*; ECF No. 283; Zest Labs, Inc. et al.; "Zest Labs Inc.'s Brief in Support of Its Motion for Partial Summary Judgment That Information in Walmart's Patent Application Was Not Generally Known or Readily Ascertainable"; United States District Court for the Eastern District of Arkansas; Case No. 4:18-CV-00500-JM; Apr. 21, 2020; pp. 1-159.
*Zest Labs, Inc.* v *Walmart*; ECF No. 284; Zest Labs, Inc. et al.; "Zest Labs Inc.'s Brief in Support of Its Motion for Partial Summary Judgment That Walmart Used and Disclosed Zest Labs' Information in the Walmart Applications"; United States District Court for the Eastern District of Arkansas; Case No. 4:18-CV-00500-JM; Apr. 21, 2020; pp. 1-165.
*Zest Labs, Inc.* v *Walmart*; ECF No. 285; Zest Labs, Inc. et al.; "Zest Labs Inc.'s Motion for Summary Judgment on Its Claim for Breach of Contract"; United States District Court for the Eastern District of Arkansas; Case No. 4:18-CV-00500-JM; Apr. 21, 2020; pp. 1-3.
*Zest Labs, Inc.* v *Walmart*; ECF No. 286; Zest Labs, Inc. et al.; "Zest Labs Inc.'s Brief in Support of Its Motion for Summary Judgment on Its Claim for Breach of Contract"; United States District Court for the Eastern District of Arkansas; Case No. 4:18-CV-00500-JM; Apr. 21, 2020; pp. 1-30.
*Zest Labs, Inc.* v *Walmart*; ECF No. 287; Zest Labs, Inc. et al.; "Plaintiffs' Response to Defendant's Motion for Summary Judgment"; United States District Court for the Eastern District of Arkansas; Case No. 4:18-CV-00500-JM; Apr. 21, 2020; pp. 1-138.
*Zest Labs, Inc.* v *Walmart*; ECF No. 288; Zest Labs, Inc. et al.; "Plaintiffs' Opposition to Defendant's Motion to Exclude Testimony of Damages Expert Stephen L. Becker, Ph.D."; United States District Court for the Eastern District of Arkansas; Case No. 4:18-CV-00500-JM; Apr. 21, 2020; pp. 1-63.
*Zest Labs, Inc.* v *Walmart*; ECF No. 289; Zest Labs, Inc. et al.; "Plaintiffs' Brief in Opposition of Defendant's Motion to Exclude Proposed Expert Testimony of Patent Attorney Q. Todd Dickinson"; United States District Court for the Eastern District of Arkansas; Case No. 4:18-CV-00500-JM; Apr. 21, 2020; pp. 1-180.
*Zest Labs, Inc.* v *Walmart*; ECF No. 290; Zest Labs, Inc. et al.; "Plaintiffs' Brief in Opposition of Defendant'S Motion to Exclude Proposed Expert Testimony of Mark Lanning"; United States District Court for the Eastern District of Arkansas; Case No. 4:18-CV-00500-JM; Apr. 21, 2020; pp. 1-62.
*Zest Labs, Inc.* v *Walmart*; ECF No. 291; Zest Labs, Inc. et al.; "Zest Labs Inc.'s Reply Brief in Support of Its Motion for Partial Summary Judgment That Information in Walmart's Patent Application Was Not Generally Known or Readily Ascertainable"; United

(56) References Cited

OTHER PUBLICATIONS

States District Court for the Eastern District of Arkansas; Case No. 4:18-CV-00500-JM; Apr. 21, 2020; pp. 1-18.
Zest Labs, Inc. v Walmart; ECF No. 292; Zest Labs, Inc. et al.; "Plaintiffs' Reply in Support of Their Motion to Exclude Testimony of Walmart's Damages Expert Dr. William Choi"; United States District Court for the Eastern District of Arkansas; Case No. 4:18-CV-00500-JM; Apr. 21, 2020; pp. 1-20.
Zest Labs, Inc. v Walmart; ECF No. 293; Zest Labs, Inc. et al.; "Brief in Support of Plaintiffs' Motion to Exclude the Testimony of Walmart's Expert Witness, Dr. David P. Dobkin"; United States District Court for the Eastern District of Arkansas; Case No. 4:18-CV-00500-JM; Apr. 21, 2020; pp. 1-13.
Zest Labs, Inc. v Walmart; ECF No. 294; Zest Labs, Inc. et al.; "Zest Labs Inc.'S Reply in Support of Their Motion for Partial Summary Judgment That Walmart Used and Disclosed Zest'S Information in the Walmart Application"; United States District Court for the Eastern District of Arkansas; Case No. 4:18-CV-00500-JM; Apr. 21, 2020; pp. 1-39.
Zest Labs, Inc. v Walmart; ECF No. 295; Zest Labs, Inc. et al.; "Plaintiffs' Reply in Support of Their Motion to Exclude the Testimony of Walmart's Expert Witness, Dr. Catherine Adams Hutt"; United States District Court for the Eastern District of Arkansas; Case No. 4:18-CV-00500-JM; Apr. 21, 2020; pp. 1-23.
Zest Labs, Inc. v Walmart; ECF No. 296; Zest Labs, Inc. et al.; "Plaintiffs' Objections to and Motion to Strike Evidence Cited in Walmart's Responses to Zest Labs, Inc.'s Statement of Material Facts in Support of Its Motions for Partial for Summary Judgement and Motion for Summary Judgment"; United States District Court for the Eastern District of Arkansas; Case No. 4:18-CV-00500-JM; Apr. 21, 2020; pp. 1-5.
Zest Labs, Inc. v Walmart; ECF No. 297; Zest Labs, Inc. et al.; "Plaintiffs' Memorandum in Support of Objections to and Motion to Strike Evidence Cited in Walmart's Responses to Zest Labs, Inc.'s Statement of Material Facts in Support of Its Motions for Partial for Summary Judgement and Motion for Summary Judgment"; United States District Court for the Eastern District of Arkansas; Case No. 4:18-CV-00500-JM; Apr. 21, 2020; pp. 1-5.
Zest Labs, Inc. v Walmart; ECF No. 298; Walmart; "Defendants Consolidated Brief in Opposition to Plaintiffs' Objections to and Motions to Strike Evidence Cited by Walmart in Connection With Summary Judgment Motions"; United States District Court for the Eastern District of Arkansas; Case No. 4:18-CV-00500-JM; May 4, 2020; pp. 1-18.
Haard, Norman F., et al.; "Characteristics of Edible Plant Tissues"; Food Chemistry, edited by Owen R. Fennema; 3rd Ed.; Marcel Dekker, Inc.; 1996; pp. 943-1011.
Kader, Adel A., et al .; "Technologies to Extend the Refrigerated Shelf Life of Fresh Fruit"; Food Storage Stability, edited by Irwin A. Taub, et al.; Boca Raton; CRC Press; 1998; pp. 1-27.

Kader, Adel A.; "Postharvest Technology of Horticultural Crops"; 2002; 3rd Ed.; University of California Agriculture and Natural Resources; Oakland; 56 pages.
Kader, Adel A.; "Postharvest Technology of Horticultural Crops"; 2002; 3rd Ed.; University of California Agriculture and Natural Resources; Oakland; 74 pages.
Kader, Adel A.; "Postharvest Technology of Horticultural Crops"; 2002; 3rd Ed.; University of California Agriculture and Natural Resources; Oakland; pp. 113-196.
Kader, Adel A.; "Postharvest Technology of Horticultural Crops"; 2002; 3rd Ed.; University of California Agriculture and Natural Resources; Oakland; pp. 197-250.
Kader, Adel A.; "Postharvest Technology of Horticultural Crops"; 2002; 3rd Ed.; University of California Agriculture and Natural Resources; Oakland; pp. 251-314.
Kader, Adel A.; "Postharvest Technology of Horticultural Crops"; 2002; 3rd Ed.; University of California Agriculture and Natural Resources; Oakland; pp. 315-384.
Kader, Adel A.; "Postharvest Technology of Horticultural Crops"; 2002; 3rd Ed.; University of California Agriculture and Natural Resources; Oakland; pp. 385-434.
Kader, Adel A.; "Postharvest Technology of Horticultural Crops"; 2002; 3rd Ed.; University of California Agriculture and Natural Resources; Oakland; pp. 435-480.
Kader, Adel A.; "Postharvest Technology of Horticultural Crops"; 2002; 3rd Ed.; University of California Agriculture and Natural Resources; Oakland; pp. 67-112.
Kong, F. et al.; "Chemical Deterioration and Physical Instability of Foods and Beverages"; The Stability and Shelf Life of Food, edited by Persis Subramaniam; 2nd Ed.; Woodhead Publishing; 2016; pp. 1-21.
Labuza, T. P., et al.; "The Relationship Between Processing and Shelf Life"; Foods for the '90s, edited by Gordon G. Birch, et al.; Elsevier Applied Science; Aug. 1, 1990; pp. 1-21.
Robertson, Gordon L.; "Food Packaging: Principles and Practice"; 3rd Ed.; Boca Raton; CRC Press; 2013; pp. 1-33.
Singh, R. P.; "Scientific Principles of Shelf-Life Evaluation"; Shelf-Life Evaluation of Foods, edited by Dominic Man, et al.; 2nd Ed.; Aspen Publishers, Inc.; 2000; pp. 1-23.
Singh, R. Paul et al.; "Introduction to Food Engineering"; 5th Ed.; Academic Press; 2014; pp. 1-31.
Wells, John H. et al.; "Quality Management During Storage and Distribution"; Food Storage Stability, edited by Irwin A. Taub, et al.; Boca Raton; CRC Press; 1998; pp. 1-29.
Wells, John H., et al.; "Temperature Tolerance of Foods during Distribution"; Handbook of Food Engineering Practice, edited by Kenneth J. Valentas, et al.; Boca Raton; CRC Press; 1997; pp. 1-29.
Wells, John H., et al.; "The Application of Time-Temperature Indicator Technology to Food Quality Monitoring and Perishable Inventory Management"; Mathematical Modelling of Food Processing Operations, edited by Stuart Thorne; Elsevier Applied Science; 1992; pp. 1-41.

* cited by examiner

| Control Elements (402) | Actions (404) |
| --- | --- |
| Gas (420) | Activation of Gas Line (430) |
| Humidity (422) | Adjust to 70% (432) |
| Temperature (424) | Set to 75°F (434) |
| Time (426) | Set Alarm or Timer (436) |

SYSTEM AND METHOD FOR RIPENING PRODUCE

CROSS-REFERENCE TO RELATED APPLICATION

This application claims the benefit of the following U.S. Provisional Application No. 62/746,614 filed Oct. 17, 2018, which is incorporated herein by reference in its entirety.

TECHNICAL FIELD

These teachings generally relate to the ripening of produce and, more specifically, to ripening the produce according to a target shipping date.

BACKGROUND

Various types of produce is grown for consumption by customers. For example, fruits and vegetables are grown, shipped to stores, and purchased by customers.

The condition of these products changes as time progresses. One way that the produce changes is that it ripens. For example, bananas ripen from the time they are picked in the production areas until they time they are purchased by customers. Stores typically want to present produce in optimum condition because if the produce is not in this condition, the produce is difficult to sell.

Ripening chambers exist that can be used to hasten the ripening process. For example, the ripening chambers can be used to increase or decrease the ripening speed of the produce.

BRIEF DESCRIPTION OF THE DRAWINGS

The above needs are at least partially met through the provision of approaches that adjust the ripening conditions of produce to conform to a target shipping date for the produce, wherein:

FIG. 4 comprises a diagram as configured in accordance with various embodiments of these teachings.

DETAILED DESCRIPTION

Figure 1:
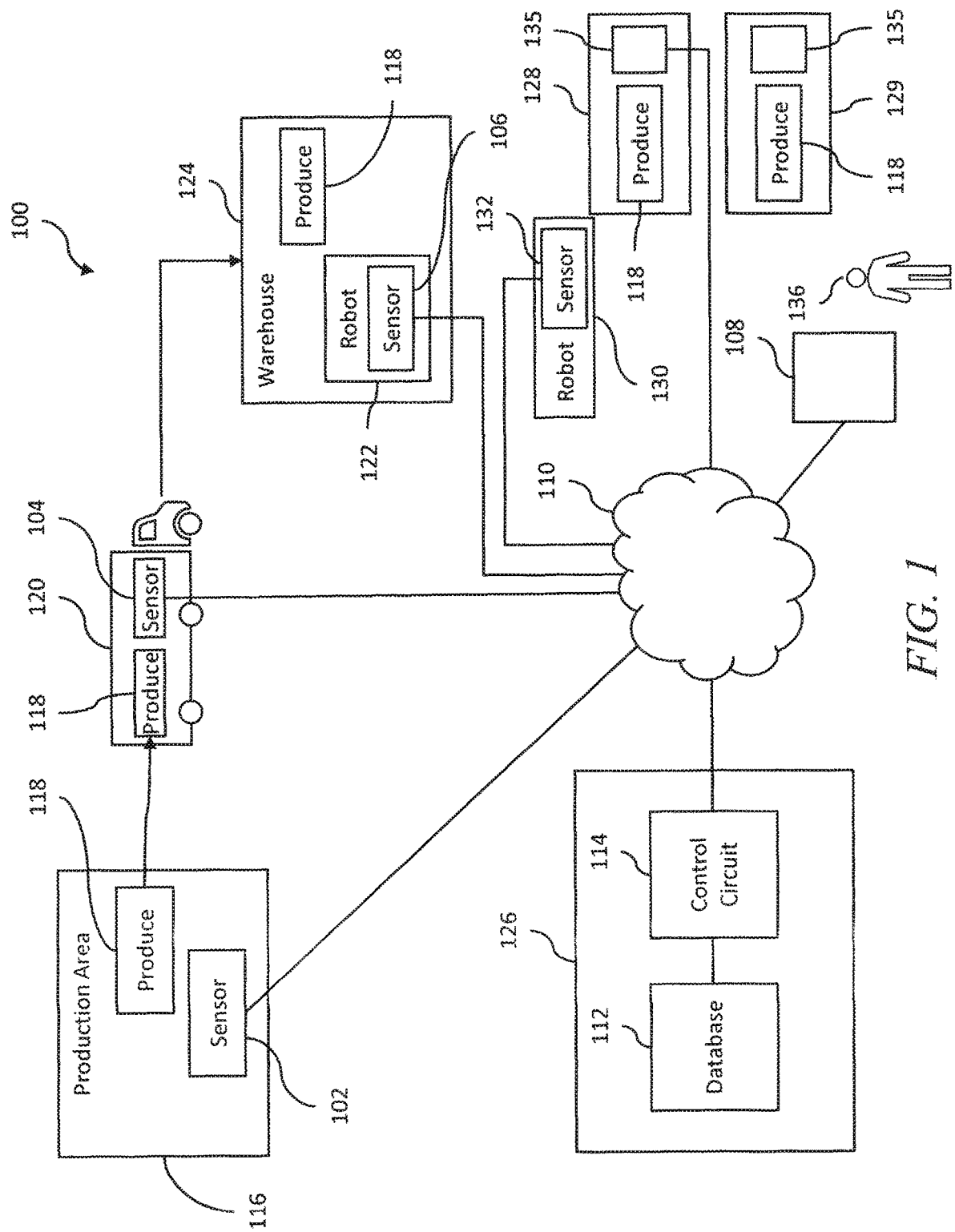
FIG. 1 comprises a diagram of a system as configured in accordance with various embodiments of these teachings.

Generally speaking, these approaches relate to being able to dynamically alter the ripening condition of a fruit or vegetable (or other produce or commodities) in order to meet changing target shipping dates. In these approaches, the target shipping date for the produce might change (e.g., from the $1^{st}$ of the month, to the $15^{th}$ of the month, and then again to the 30th of the month), based on a wide variety of different factors. As the date changes, the operating conditions of the chamber are changed to conform the condition of the produce to the new shipping dates. Put another way, the desired condition of the produce is manipulated to meet the target shipping date, even as this shipping date changes.

In aspects, data is gathered from the field (e.g., the country of origin, growing conditions, temperature, and humidity to mention a few examples). Transport conditions (e.g., time in transit, temperature, humidity) are also monitored. The item is received at the warehouse, and a robot automatically grades the item. A human may alternatively grade the item. All of the sensed or gathered information is included in a profile. The profile is converted into a schedule which is applied to control the conditions and other aspects of operation of a ripening chamber. In examples, the schedule might include the time spent by the fruit in the chamber and temperature and/or humidity conditions of the chamber.

Periodically, humans or automated sensors check the condition of the produce and/or the conditions of the chamber. For example, images may be obtained of the produce in the chamber and a determination is made as to whether it is ripening too fast. If the produce is ripening too quickly, then the schedule for the chamber can be adjusted. Other schedules for other chambers may also be adjusted based upon information obtained from the experience of produce in the one chamber.

The parameters of the schedule are selected so that the produce is shipped in suitable condition to meet a certain target date. In other aspects, the target date is adjusted dynamically and in real-time as demand (or other) conditions or other requirements change. This adjusts the schedule of the chamber. For example, a store may need more or less of the produce on a certain data and this amount can change over time.

In many of these embodiments, a system that is configured to adjust ripening conditions for produce includes a first sensor, a second sensor, a third sensor, an electronic user device, and electronic communication network, a database, and a control circuit.

The first sensor is deployed in a production area of produce. The first sensor obtains first information concerning growing conditions of the produce.

The second sensor is deployed on a shipment vehicle. The shipment vehicle moves the produce from the production area. The second sensor obtains second information associated with shipment conditions of the produce.

The third sensor is deployed at a first robot at a distribution center or warehouse. The produce is delivered to the distribution center or warehouse via the shipment vehicle. The third sensor is configured to determine third information concerning the condition and grade of the produce.

The electronic user device is configured to receive from a user a target shipping date to ship the produce to a retail store or customer from the distribution center or warehouse. The electronic communication network is coupled to the first sensor, the second sensor, the third sensor, and the electronic user device. The database is disposed at a central processing center and is configured to store the first information, the second information, the third information, and the target shipping date.

The control circuit is disposed at the central processing center and is coupled to the network and the database. The control circuit is configured to obtain the first information, second information, third information, and target shipping date from the database and create a ripening schedule. The ripening schedule when implemented at a ripening chamber is effective to control the environmental conditions and the time spent in the ripening chamber by the produce in order to conform ripening conditions of the produce to conditions desired to meet the target shipping date. For example, the produce may need to be in a particular ripening state on a particular shipping date.

The control circuit is further configured to apply the ripening schedule to control ripening conditions in the ripening chamber and receive an adjusted target shipping date from the user device via the network. The control circuit is still further configured to dynamically and in real-time adjust the ripening schedule in order to conform ripening conditions of the produce to satisfy the adjusted target shipping date. The control circuit is further configured to apply the adjusted ripening schedule to control ripening conditions in the ripening chamber.

A second robot obtains fourth information concerning conditions of the produce in the ripening chamber. The control circuit is configured to dynamically and in real-time adjust the ripening schedule according to the fourth information.

In some aspects, the control circuit utilizes the fourth information to adjust a second ripening schedule of a second ripening chamber. In other aspects, the ripening schedule defines one or more of: the time the produce is held in the ripening chamber, the temperature of the ripening chamber, the humidity of the ripening chamber, and the application of a gas (e.g., ethylene gas) to the produce in the ripening chamber that is effective to hasten ripening of the produce.

In some examples, the first sensor obtains weather information. In other examples, the second sensor measures the amount of time spent by the produce in transit on the vehicle. In still other examples, the third sensor comprises a camera and the camera obtains images of the produce.

In other aspects, the produce is shipped according to the target shipping date or the adjusted target shipping date. In other examples, the shipment vehicle comprises a ground vehicle, an aircraft, an automated ground vehicle, an aerial drone, or a ship. Other examples of vehicles (or combinations of vehicles) are possible.

In others of these embodiments, approaches for adjusting ripening conditions for produce are provided. At a first sensor, first information is obtained concerning growing conditions of produce. The first sensor is deployed in a production area of the produce.

At a second sensor that is deployed on a shipment vehicle, second information associated with shipment conditions of the produce is obtained. The shipment vehicle moves the produce from the production area.

At a third sensor that is deployed at a first robot at a distribution center or warehouse, third information concerning the condition and grade of the produce is determined or obtained. The produce is delivered to the distribution center or warehouse via the shipment vehicle.

A target shipping date to ship the produce to a retail store or customer from the distribution center or warehouse is received from a user at an electronic user device. At a database at a central processing center the first information, the second information, the third information, and the target shipping date are stored.

At a control circuit at the central processing center, the first information, the second information, the third information, and the target shipping date are obtained from the database. A ripening schedule is created and the ripening schedule when implemented at a ripening chamber is effective to control the environmental conditions and the time spent in the ripening chamber by the produce in order to conform ripening conditions of the produce to the target shipping date. The ripening schedule is applied to control ripening conditions in the ripening chamber.

At the control circuit, an adjusted target shipping date is received from the user device via the network. The ripening schedules is adjusted dynamically and in real-time in order to conform ripening conditions of the produce to satisfy the adjusted target shipping date. The adjusted ripening schedule is applied to control ripening conditions in the ripening chamber.

A second robot obtains fourth information concerning conditions of the produce in the ripening chamber. The control circuit dynamically and in real-time adjusts the ripening schedule according to the fourth information.

Referring now to FIG. 1, a system 100 includes a first sensor 102, a second sensor 104, a third sensor 106, an electronic user device 108, and electronic communication network 110, a database 112, and a control circuit 114.

The first sensor 102 is deployed in a production area 116 of produce 118. The production area 116 may be fields, groves, or other areas used to grow the produce 118. The first sensor 102 obtains first information concerning growing conditions of the produce 118. For example, the growing conditions may include the rainfall, the temperature patterns, or the humidity patterns of the production area 116. In other examples, the growing conditions include the country (or geographic area) or origin.

The second sensor 104 is deployed on a shipment vehicle 120. The shipment vehicle 120 moves the produce from the production area 116. In other examples, the shipment vehicle 120 comprises a ground vehicle, an aircraft, an automated ground vehicle, an aerial drone, or a ship. In other aspects, the shipment vehicle 120 is a combination of two or more vehicles (e.g., a truck, a ship, and then a truck). The second sensor 104 obtains second information associated with shipment conditions of the produce 118. For example, the time the produce 118 spends on the shipment vehicle 120, the temperature conditions or records of the chamber on the vehicle where the produce is stored may be sensed and/or obtained.

The third sensor 106 is deployed at a first robot 122 at a distribution center or warehouse 124. The produce 118 is delivered to the distribution center or warehouse 124 via the shipment vehicle 120. The third sensor 106 is configured to determine third information concerning the condition and grade of the produce 118. For example, the third sensor 106 may gather images of the produce 118, which can be analyzed to determine the grade of the produce 118.

The electronic user device 108 is configured to receive from a user 136 a target shipping date to ship the produce to a retail store or customer from the distribution center or warehouse 124. The electronic user device 108 may be any electronic device such as a personal computer, laptop, tablet, cellular phone, or smartphone to mention a few examples.

The electronic communication network 110 is coupled to the first sensor 102, the second sensor 104, the third sensor 106, and the electronic user device 108. The electronic communication network 110 may be any network or combination of networks such as the internet, a wireless network, a cellular communication network, a wide area network, or a local area network to mention a few examples.

The user 136 may enter the target shipping date into the electronic user device 108 and this information is stored in the database 112 (e.g., via action of the control circuit 114). The database 112 is disposed at a central processing center 126 and is configured to store the first information, the second information, the third information, and the target shipping date. The database 112 may be any suitable memory storage device.

The control circuit 114 is disposed at the central processing center 126 and is coupled to the network 110 and the database 112. It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 114 may be configured (for example, by using corresponding programming stored in a memory as will be well understood by those skilled in the art) to carry out one or more of the steps, actions, and/or functions described herein.

The control circuit 114 is configured to obtain the first information, second information, third information, and target shipping date from the database 112 and create a ripening schedule. The ripening schedule when implemented at a ripening chamber 128 is effective to control the environmental conditions and the time spent in the ripening chamber 128 by the produce in order to conform ripening conditions of the produce to the target shipping date.

The control circuit 114 is further configured to apply the ripening schedule to control ripening conditions in the ripening chamber 128 and receive an adjusted target shipping date from the user device 108 via the network 110. The control circuit 114 is still further configured to dynamically and in real-time adjust the ripening schedule in order to conform ripening conditions of the produce to satisfy the adjusted target shipping date. The control circuit 114 is additionally configured to apply the adjusted ripening schedule to control ripening conditions in the ripening chamber 128.

A second robot 130 with a fourth sensor 132 obtains fourth information concerning conditions of the produce in the ripening chamber. The control circuit 114 is configured to dynamically and in real-time adjust the ripening schedule according to the fourth information.

The first robot 122 and the second robot 130 may be automated ground vehicles, aerial drones, or robotic devices at a fixed location. As mentioned, the robots 122 and 130 may include sensors that obtain images of the produce or sense conditions. The robots 122 and 130 may also perform other functions. For example, the robots 122 and 130 may also include the ability for the robot to actually inspect the interior of the produce 118 and various other attributes such as the adherence of the skin. These aspects may also be checked by humans. Furthermore, the robots 122 and 130 may also perform other functions such as moving the produce 118 from location-to-location.

In some aspects, the control circuit 114 utilizes the fourth information to adjust a second ripening schedule of a second ripening chamber 129. In other aspects, the ripening schedule defines one or more of the time the produce is held in the ripening chamber 129, the temperature of the ripening chamber 129, the humidity of the ripening chamber 129, and the application of a gas to the produce in the ripening chamber 129 that is effective to hasten ripening of the produce 118. An apparatus 135 is used by the control circuit 114 to control these conditions.

In still other aspects, the produce 118 is shipped from the ripening chamber 128 according to the target shipping date or the adjusted target shipping date. As mentioned, the condition of the produce 118 conforms to a condition needed to meet the target shipping date. In one example, the ripening state of the produce 118 (how much it has ripened according to visual or non-visual inspection of the produce) will conform or substantially conform to the ripening conditions desired by a retail store according to the shipping date.

Figure 2:
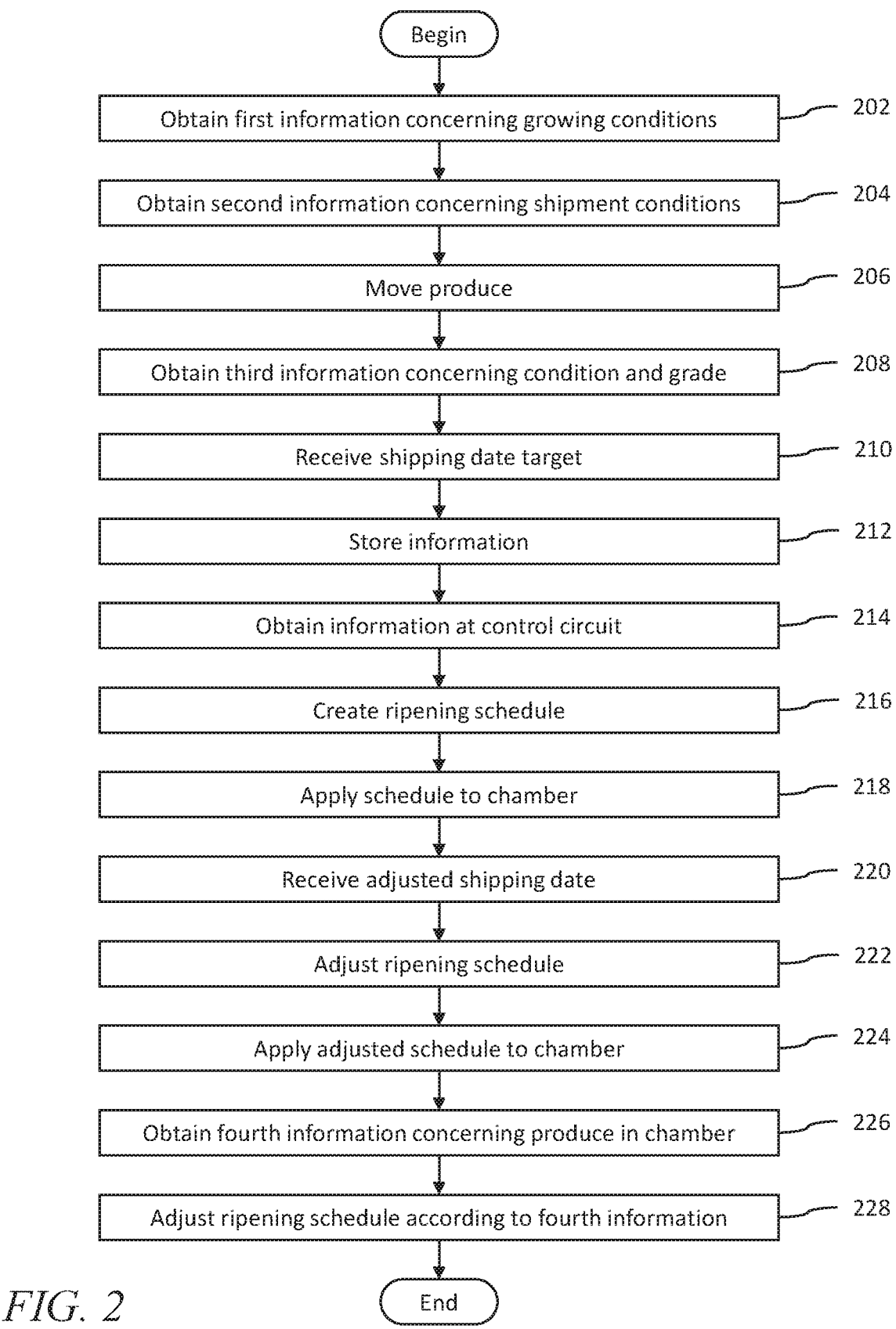
FIG. 2 comprises a flowchart as configured in accordance with various embodiments of these teachings.

Referring now to FIG. 2, one approach for adjusting the ripening conditions for produce is described. At step 202 and at a first sensor, first information is obtained concerning growing conditions of the produce. The first sensor is deployed in a production area of the produce. For example, the first sensor may monitor for weather conditions in the fields where the produce is grown (e.g., rainfall, humidity, or sunshine to mention a few examples). In other examples, the sensor may detect or receive the country, state, city or some other geographical point or area of origin of the produce. It will be appreciated that more than one sensor may be deployed when more than one type of information is obtained.

At step 204 and at a second sensor that is deployed on a shipment vehicle, second information associated with shipment conditions of the produce is obtained. For example, the information may include the transit time of the produce in the vehicle or conditions (e.g., temperature or humidity) in the vehicle. As with the first sensor, it will be appreciated that more than one sensor may be deployed when more than one type of information is obtained.

At step 206, the shipment vehicle moves the produce from the production area. In examples, the vehicle is a truck. In other examples, more than one vehicle may be involved (e.g., the produce may be shipped first in a first truck, then in a ship, and then in a second truck for delivery to a warehouse). When more than one vehicle, more than one second sensor may be deployed (e.g., one or more sensors in the first truck, one or more sensors in the ship, and one or more sensors in the second truck).

At step 208 and at a third sensor that is deployed at a first robot at a distribution center or warehouse, third information concerning the condition and grade of the produce is determined. The produce is delivered to the distribution center or warehouse via the shipment vehicle. For example, a camera may be used to obtain images of the produce. A computer program (at the first robot, the warehouse, or a central location) may be used to analyze the image. It will be appreciated that more than one third sensor may be deployed when more than one type of information is obtained.

At step 210, a target shipping date to ship the produce to a retail store or customer from the distribution center or warehouse is received from a user at an electronic user device. The electronic user device may be any electronic device such as a personal computer, laptop, tablet, or smartphone to mention a few examples. The target shipping date may specify a calendar date and/or time on a specific date to ship the produce. Other examples of target shipping dates are possible.

At step 212 and at a database at a central processing center the first information, the second information, the third information, and the target shipping date are stored. The data may be received over the same network, different networks, or combinations of different electronic networks to mention a few examples. The database is maintained at a central location so as to allow the collection of information from various sensors spread across a wide variety of different geographical locations.

At step 214 and at a control circuit at the central processing center, the first information, the second information, the third information, and the target shipping date are obtained from the database. The control circuit is likewise disposed at the central location so as to facilitate the fast and efficient processing of information. If, for example, the control circuit were disposed at scattered remote locations it would be extremely difficult to efficiently and quickly process received sensed information and issue appropriate instructions.

At step 216 and at the control circuit, a ripening schedule is created and the ripening schedule when implemented at a ripening chamber is effective to control the environmental conditions and the time spent in the ripening chamber by the produce in order to conform ripening conditions of the produce to the target shipping date. The ripening schedule may specify the conditions within a ripening chamber and how long these conditions are to be applied. For example, if the produce is to be exposed to elements (e.g., gas) that hasten ripening, the schedule may specify how long these elements are applied and, when multiple elements are applied, the order of application. In still other examples, conditions in the ripening chamber may also be changed. For example, temperature and humidity conditions may be changed.

At step 218 and at the control circuit, the ripening schedule is applied to control ripening conditions in the ripening chamber. For example, electronic instructions may be sent to the ripening chamber. The electronic instructions cause mechanical elements within the chamber to function (e.g., release the gas or change the temperature in the chamber). For example, the mechanical elements that are controlled may include gas control valves or heaters/cooling elements and fans that adjust the temperature. Other examples are possible.

At step 220 and at the control circuit, an adjusted target shipping date is received from the user device via the network. For example, a retail store may first communicate that it needs the produce on the 15th of the month, and later communicate it needs the produce on the 30th of the month. It will be appreciated that the target shipping date may change multiple times.

At step 222, the ripening schedules is adjusted dynamically and in real-time in order to conform ripening conditions of the produce to satisfy the adjusted target shipping date. For example, if the produce needs to be ripened more quickly, the schedule is adjusted to take into account that the produce needs to be in a more ripe condition to meet the target shipping date.

At step 224, the adjusted ripening schedule is applied to control ripening conditions in the ripening chamber. As mentioned, electronic instructions may be created and the electronic instructions cause mechanical elements within the chamber to function (e.g., release the gas or change the temperature in the chamber). For example, the mechanical elements that are controlled may include gas control valves or heaters/cooling elements and fans that adjust the temperature. Other examples are possible.

At step 226, a second robot obtains fourth information concerning conditions of the produce in the ripening chamber. For example, the robot may obtain images of the produce and grade the condition of the produce. In these regards, the images may compare the condition of the produce to images of produce with a known condition, and based upon the comparison, the condition of the produce is determined. A computer program (at the second robot, the ripening chamber, or a central location) may be used to analyze the image. As used herein, "grade" may refer to the color, moisture content, overall appearance, interior condition, and/or surface condition of the produce. Other examples of criteria can be used to grade or classify the produce.

At step 228, the control circuit dynamically and in real-time adjusts the ripening schedule according to the fourth information. For example, the conclusion may be that the produce is ripening too quickly so that humidity and/or temperature of the chamber is adjusted so that the produce is ripened correctly to satisfy the target shipping date.

It will be appreciated that the adjustments made in one chamber can be applied and used in determining the ripening schedules in other ripening chambers. For example, it may be determined that the humidity conditions in a first chamber are causing the produce in that chamber to ripen too quickly. This information can be applied to the ripening schedules determined for other chambers. For example and for the other chambers, the optimum humidity level required for a particular result in a first chamber and be used to obtain the same or a similar result in these other chambers.

Figure 3:
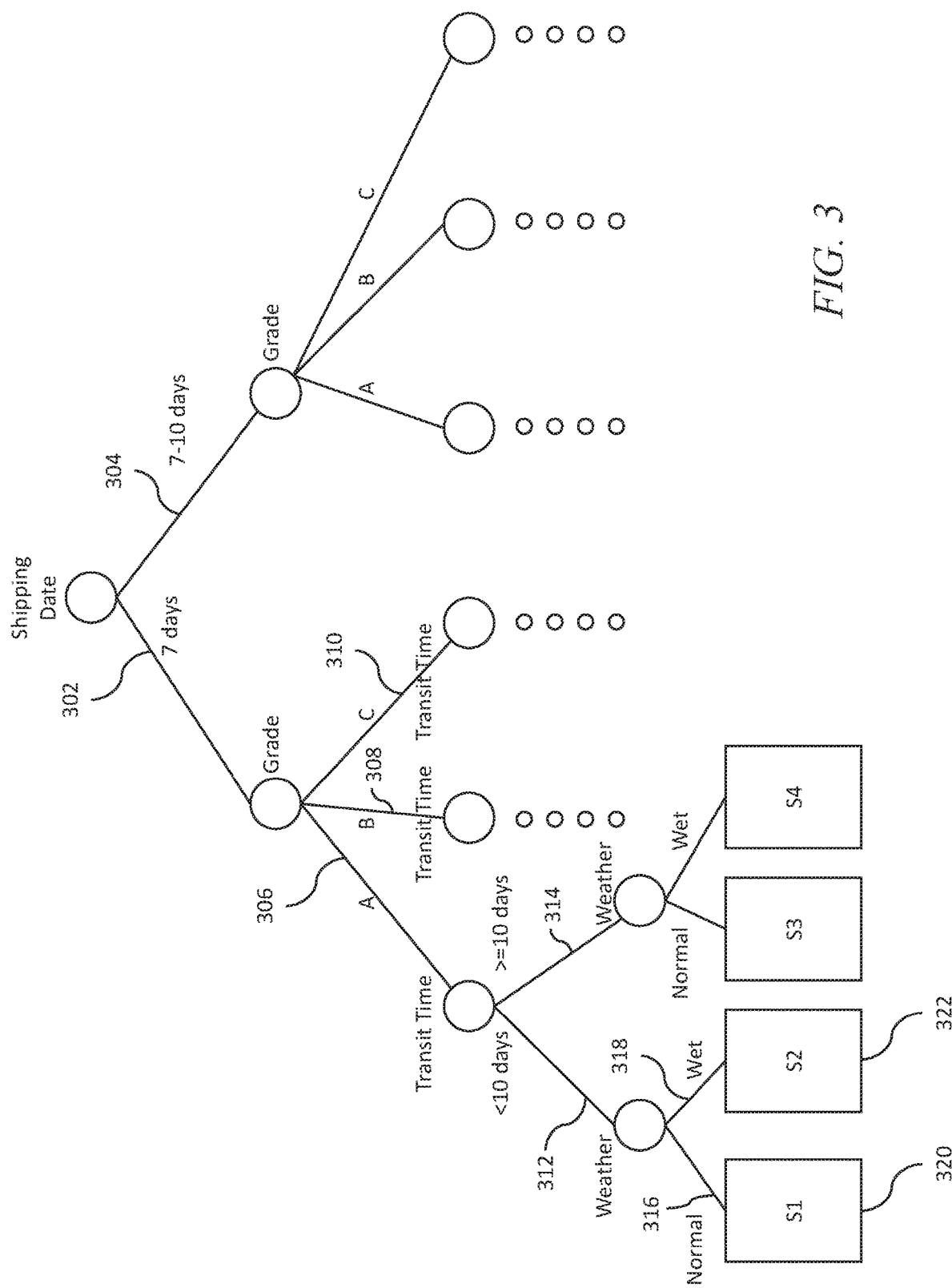
FIG. 3 comprises a diagram as configured in accordance with various embodiments of these teachings.

Referring now to FIG. 3, one example of an approach of determining a ripening schedule is described. The approach is represented as a tree-like data structure where decisions are made as to various criteria until a particular ripening schedule is determined or selected.

The first criteria is the target shipping date. If the target shipping date is within the next 7 days, then branch 302 is selected. If the target shipping date is within the between 7-10 days, then branch 304 is selected.

Next, the grade of the produce is considered. If the produce is grade A, then branch 306 is selected. If the produce is grade B, then branch 308 is selected. If the produce is grade C, then branch 310 is selected. As mentioned, the grade level may refer to the color, moisture content, overall appearance, interior condition, and/or surface condition of the produce. Other examples of grades (or classifications) and grading criteria are possible.

Assuming branch 306 if followed, then the transit time for the produce on board the shipment vehicle is next considered. If the transit time is less than 10 days, then branch 312 is selected. If the transit time is 10 or more days, then go branch 314 is selected for execution.

Assuming branch 312 is taken, then weather conditions are considered. If normal weather conditions have occurred (e.g., as evidenced by the number of days with rainfall, the amount of sunny days or other criteria), then branch 316 with a first schedule (s1) 320 is selected. If wet weather conditions have occurred (as evidenced by the amount of rainfall in the production area of the produce), then branch 318 with a second schedule (s2) 322 is selected. Other schedules are selected based upon traversal of the tree under other conditions.

It will be understood that other portions of the tree are not shown, but that similar branches a decisions would occur or be present. It will also be appreciated that other approaches could be used to select a schedule. For example, a mathematical formula (or more than one formula) can be used. However, it is contemplated that the particular approach described will make for more efficient and faster computer operation than other approaches.

Referring now to FIG. 4, one example of a schedule 400 is described. The schedule includes control elements (or control criteria) 402 and actions 404 associated with control elements (or control criteria) 402. In this example, the elements 402 include gas 420, humidity 422, temperature 424, and time 426. The actions 404 include activation 430 for a gas application line (associated with gas 420). Changing the humidity level to 70% is action 432 and is associated with humidity 422. Changing the heating/cooling to obtain a 75 degrees temperature in the ripening chamber is action 434 and is associated with temperature 424. Setting an alarm or a timer that when expired activates an alarm is action 436 associated with controlling the amount of time 426 spent in the chamber by the produce. An indication of expiration of the timer or an alarm may be sent electronically to a human or robot via to instruct the human or robot to remove the produce from the chamber.

In some embodiments, one or more of the exemplary embodiments include one or more localized IoT devices and controllers (e.g., included with or associated with the various sensors or robots described herein). In another aspect, the sensors or robots may be seen as an IoT device. As a result, in an exemplary embodiment, the localized IoT devices and controllers can perform most, if not all, of the computational load and associated monitoring and then later asynchronous uploading of data can be performed by a designated one of the IoT devices to a remote server. In this manner, the computational effort of the overall system may be reduced significantly. For example, whenever localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of data may include a key kernel index summary of the data as created under nominal conditions. In an exemplary embodiment, the kernel encodes relatively recently acquired intermittent data ("KRI"). As a result, in an exemplary embodiment, KRI includes a continuously utilized near term source of data, but KRI may be discarded depending upon the degree to which such KRI has any value based on local processing and evaluation of such KM. In an exemplary embodiment, KRI may not even be utilized in any form if it is determined that KRI is transient and may be considered as signal noise. Furthermore, in an exemplary embodiment, the kernel rejects generic data ("KRG") by filtering incoming raw data using a stochastic filter that provides a predictive model of one or more future states of the system and can thereby filter out data that is not consistent with the modeled future states which may, for example, reflect generic background data. In an exemplary embodiment, KRG incrementally sequences all future undefined cached kernals of data in order to filter out data that may reflect generic background data. In an exemplary embodiment, KRG incrementally sequences all future undefined cached kernals having encoded asynchronous data in order to filter out data that may reflect generic background data. In a further exemplary embodiment, the kernel will filter out noisy data ("KRN"). In an exemplary embodiment, KRN, like KRI, includes substantially a continuously utilized near term source of data, but KRN may be retained in order to provide a predictive model of noisy data. In an exemplary embodiment, KRN and KRI, also incrementally sequences all future undefined cached kernels having encoded asynchronous data in order to filter out data that may reflect generic background data.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A system that is configured to adjust ripening conditions for produce, the system comprising:
    a first shipment vehicle that is configured to transport produce;
    a second shipment vehicle that is configured to transport the produce;
    a first ripening chamber, the first ripening chamber including at least one first mechanical element that controls environmental conditions within the first ripening chamber, wherein the at least one first mechanical element is one or more of: a gas control valve, a heating element, a cooling element, or a fan;
    a second ripening chamber, the second ripening chamber including at least one second mechanical element that controls environmental conditions within the second ripening chamber, wherein the at least one second mechanical element is one or more of: a gas control valve, a heating element, a cooling element, or a fan;
    a first sensor that is deployed on the first shipment vehicle, the first shipment vehicle moving the produce from the production area, the first sensor obtaining first information associated with shipment conditions of the produce;
    a second sensor that is deployed at a distribution center or warehouse, the produce being delivered to the distribution center or warehouse via the first shipment vehicle, the second sensor configured to determine second information concerning the condition and grade of the produce;
    an electronic user device that is configured to receive from a user a target shipping date to ship the produce to a retail store or customer from the distribution center or warehouse;
    an electronic communication network coupled to the first sensor, the second sensor, and the electronic user device;
    a database at a central processing center that is configured to store the first information, the second information, and the target shipping date;
    a control circuit at the central processing center and coupled to the network and the database, the control circuit configured to:
    obtain the first information, second information, and target shipping date from the database and
    create a first ripening schedule, the first ripening schedule when implemented at the first ripening chamber being effective to control the environmental conditions and the time spent in the first ripening chamber by the produce in order to conform ripening conditions of the produce to the target shipping date;
    apply the first ripening schedule to control ripening conditions in the first ripening chamber, wherein the first ripening schedule is applied via first electronic instructions to the at least one first mechanical element of the first ripening chamber and the first electronic instructions are effective to control the physical operation of the at least one first mechanical element of the first ripening chamber;
    wherein third information concerning conditions of the produce in the first ripening chamber is obtained and wherein the control circuit is configured to adjust the first ripening schedule according to the third information;
    wherein the control circuit utilizes the third information to adjust a second ripening schedule of the second ripening chamber, wherein the adjusted second ripening schedule is applied via second electronic instructions to the at least one second mechanical element of the second ripening chamber and the second electronic instructions are effective to control the physical operation of the at least one second mechanical element of the second ripening chamber;
    wherein the produce is shipped on the second shipment vehicle according to the target shipping date.

2. The system of claim 1, wherein the first ripening schedule defines one or more of: the time the produce is held in the first ripening chamber, the temperature of the first ripening chamber, the humidity of the first ripening chamber, and the application of a gas to the produce in the first ripening chamber that is effective to hasten ripening of the produce.

3. The system of claim 1, wherein the first sensor measures the amount of time spent by the produce in transit on the first shipment vehicle.

4. The system of claim 1, wherein the second sensor comprises a camera and the camera obtains images of the produce.

5. The system of claim 1, wherein the first shipment vehicle comprises a ground vehicle, an aircraft, an automated ground vehicle, an aerial drone, or a ship.

6. The system of claim 1, wherein the control circuit is further configured to:
   receive an adjusted target shipping date from the user device via the network and adjust the first ripening schedule to form an adjusted first ripening schedule in order to conform ripening conditions of the produce to satisfy the adjusted target shipping date;
   apply the adjusted first ripening schedule to control ripening conditions in the first ripening chamber, wherein the adjusted first ripening schedule is applied via third electronic instructions to the at least one first mechanical element of the first ripening chamber and the third electronic instructions are effective to control the physical operation of the at least one first mechanical element of the first ripening chamber.

7. The system of claim 6, wherein the produce is shipped on the second shipment vehicle according to the adjusted target shipping date.

8. The system of claim 1, further comprising a third sensor that is deployed in a production area of the produce, the third sensor obtaining fourth information concerning growing conditions of the produce.

9. The system of claim 8, wherein the third sensor obtains weather information.

10. A method for adjusting ripening conditions for produce, the method comprising:
   providing a first shipment vehicle that is configured to transport produce;
   providing a second shipment vehicle that is configured to transport the produce;
   providing a first ripening chamber, the first ripening chamber including at least one first mechanical element that controls environmental conditions within the first ripening chamber, wherein the at least one first mechanical element is one or more of: a gas control valve, a heating element, a cooling element, or a fan;
   providing a second ripening chamber, the second ripening chamber including at least one second mechanical element that controls environmental conditions within the second ripening chamber, wherein the at least one second mechanical element is one or more of: a gas control valve, a heating element, a cooling element, or a fan;
   at a first sensor that is deployed on the first shipment vehicle, obtaining first information associated with shipment conditions of the produce, the first shipment vehicle moving the produce from the production area;
   at a second sensor that is deployed at a distribution center or warehouse, determining second information concerning the condition and grade of the produce, the produce being delivered to the distribution center or warehouse via the first shipment vehicle;
   receiving from a user at an electronic user device a target shipping date to ship the produce to a retail store or customer from the distribution center or warehouse;
   storing at a database at a central processing center the first information, the second information, and the target shipping date;
   at a control circuit at the central processing center, obtaining the first information, the second information, and the target shipping date from the database and creating a first ripening schedule, the first ripening schedule when implemented at the first ripening chamber being effective to control the environmental conditions and the time spent in the first ripening chamber by the produce in order to conform ripening conditions of the produce to the target shipping date, and applying the first ripening schedule to control ripening conditions in the first ripening chamber, wherein the first ripening schedule is applied via first electronic instructions to the at least one first mechanical element of the first ripening chamber and the first electronic instructions are effective to control the physical operation of the at least one first mechanical element of the first ripening chamber;
   wherein third information concerning conditions of the produce in the first ripening chamber is obtained and wherein the control circuit dynamically and in real-time adjusts the first ripening schedule according to the third information;
   wherein the control circuit utilizes the third information to adjust a second ripening schedule of the second ripening chamber, wherein the adjusted second ripening schedule is applied via second electronic instructions to the at least one second mechanical element of the second ripening chamber and the second electronic instructions are effective to control the physical operation of the at least one second mechanical element of the second ripening chamber;
   wherein the produce is shipped on the second shipment vehicle according to the target shipping date.

11. The method of claim 10, wherein the first ripening schedule defines one or more of: the time the produce is held in the first ripening chamber, the temperature of the first ripening chamber, the humidity of the first ripening chamber, and the application of a gas to the produce in the first ripening chamber that is effective to hasten ripening of the produce.

12. The method of claim 10, wherein the first sensor measures the amount of time spent by the produce in transit on the first shipment vehicle.

13. The method of claim 10, wherein the second sensor comprises a camera and the camera obtains images of the produce.

14. The method of claim 10, wherein the first shipment vehicle comprises a ground vehicle, an aircraft, an automated ground vehicle, an aerial drone, or a ship.

15. The method of claim 10, further comprising:
   at the control circuit, receiving an adjusted target shipping date from the user device via the network and adjusting the first ripening schedule to form an adjusted first ripening schedule in order to conform ripening conditions of the produce to satisfy the adjusted target shipping date;
   at the control circuit, applying the adjusted first ripening schedule to control ripening conditions in the first ripening chamber, wherein the adjusted first ripening schedule is applied via third electronic instructions to the at least one first mechanical element of the first ripening chamber and the third electronic instructions are effective to control the physical operation of the at least one first mechanical element of the first ripening chamber.

16. The method of claim 15, wherein the produce is shipped on the second shipment vehicle according to the adjusted target shipping date.

17. The method of claim 10, further comprising at a third sensor that is deployed in a production area of the produce, obtaining fourth information concerning growing conditions of the produce.

18. The method of claim 17, wherein the third sensor obtains weather information.

* * * * *